(12) United States Patent
Corral

(10) Patent No.: US 7,337,124 B2
(45) Date of Patent: Feb. 26, 2008

(54) METHOD AND SYSTEM FOR A QUALITY SOFTWARE MANAGEMENT PROCESS

(75) Inventor: David Perez Corral, Sant Cugat del Valles (ES)

(73) Assignee: International Business Machines Corporation, Armonk, NY (US)

( * ) Notice: Subject to any disclaimer, the term of this patent is extended or adjusted under 35 U.S.C. 154(b) by 1189 days.

(21) Appl. No.: 09/942,512

(22) Filed: Aug. 29, 2001

(65) Prior Publication Data

US 2003/0188290 A1 Oct. 2, 2003

(51) Int. Cl.
*G06F 9/46* (2006.01)
*G06F 9/44* (2006.01)

(52) U.S. Cl. .......................... 705/9; 717/101
(58) Field of Classification Search ........ 717/100–102; 705/7–9
See application file for complete search history.

(56) References Cited

U.S. PATENT DOCUMENTS

| | | | |
|---|---|---|---|
| 5,208,765 A * | 5/1993 | Turnbull ..................... 702/84 |
| 5,416,694 A * | 5/1995 | Parrish et al. ................. 705/8 |
| 5,706,452 A * | 1/1998 | Ivanov ....................... 715/751 |
| 5,734,837 A * | 3/1998 | Flores et al. .................. 705/7 |
| 5,799,286 A * | 8/1998 | Morgan et al. ............... 705/30 |
| 5,848,271 A * | 12/1998 | Caruso et al. .............. 712/220 |
| 6,073,107 A * | 6/2000 | Minkiewicz et al. .......... 705/7 |
| 6,088,717 A * | 7/2000 | Reed et al. ................. 709/201 |
| 6,222,535 B1 * | 4/2001 | Hurd, II .................... 715/733 |
| 6,226,784 B1 * | 5/2001 | Holmes et al. ............. 717/100 |
| 6,519,763 B1 * | 2/2003 | Kaufer et al. .............. 717/101 |
| 6,553,365 B1 * | 4/2003 | Summerlin et al. ........... 707/2 |
| 6,567,783 B1 * | 5/2003 | Notani et al. ................ 705/9 |
| 6,606,740 B1 * | 8/2003 | Lynn et al. ................ 717/100 |
| 6,658,643 B1 * | 12/2003 | Bera .......................... 717/101 |
| 6,859,781 B1 * | 2/2005 | Gloor et al. ................... 705/7 |
| 6,957,384 B2 * | 10/2005 | Jeffery et al. ............. 715/501.1 |
| 2001/0032105 A1 * | 10/2001 | Frye et al. ..................... 705/7 |
| 2002/0023176 A1 * | 2/2002 | Kwicinski ................... 709/317 |
| 2002/0052862 A1 * | 5/2002 | Scott et al. .................... 707/1 |
| 2002/0147620 A1 * | 10/2002 | Walsh ........................... 705/7 |
| 2002/0147632 A1 * | 10/2002 | Winham et al. ............. 705/11 |
| 2003/0229524 A1 * | 12/2003 | Reuveni ........................ 705/7 |

FOREIGN PATENT DOCUMENTS

JP 2000235488 A * 8/2000

OTHER PUBLICATIONS

Baresi, L, Casati, F, Castano, S, Fugini, MG, Pernici, B, "WIDE Workflow Development Methodology", p. 19-28. 1999 ACM, retrieved from ACM Portal Aug. 4, 2004.*

(Continued)

*Primary Examiner*—Mary Steelman
(74) *Attorney, Agent, or Firm*—John R. Pivnichny; Dillon & Yudell LLP

(57) ABSTRACT

A quality management framework system and method for operating a quality plan in a product development organization having quality objectives. The system includes a plurality of computer implemented tools accessible by users for operating a plurality of quality processes. Data relative to the quality processes is collected and aggregated to generate quality reports. Reports are analyzed and problems are detected through a defect prevention process. Quality actions are initiated in a feedback quality management action tracking process.

15 Claims, 11 Drawing Sheets

OTHER PUBLICATIONS

Muravlyova, Olga, Muravlyov, Oleg, "Quality Management Information System in Manufacturing Electrical Machines", p. 170-174, Mar. 2, 2001, retrieved from IEEE database Aug. 4, 2004.*

Raikundalia, Gitesh K, "A Web Tool for Asynchronous, Collaborative Development of Electronic Meeting Agendas", Jul. 1998, retrieved from IEEE database Aug. 4, 2004.*

Sauer, Ly Danielle, Lindquist, Timothy E., Cairney, Jeremy, "Tracking Personal Processes in Group Projects", p. 364-369, 199 IEEE, retrieved Aug. 4, 2004.*

Bell, Simon; Kastelic, Ted; "Inside Intel-coping with complex projects", p. 17-24, Engineering Management Journal Feb. 2001, IEEE search Nov. 24, 2005.*

Collofello, Dr. James; Chauhan, Anamika; Rus, Ioana; Houston, Dan' Sycamore, Douglas; Smith-Daniels, Dr. Dwight; A System Dynamics Software Process Simulator for Staffing Policies Decision Support p. 103-111, 1998 IEEE, retrieved Nov. 27, 2005.*

Runeson, Per; Isacsson, Peter; "Software Quality Assurance-Concepts and Misconceptions", p. 853-859, 1998 IEEE, retrieved Nov. 24, 2005.*

"Appendix I: Design and Construction Changes and Problems at New US Embassy in Moscow-Quality Assurance, Part 1", Briefing Report to the Chairman, Com on the Budget, US Senate, Wash, DC, General Accounting Office, Apr. 1987. GAO-NSIAD-87-125. pp. 12-13. retrieved Mar. 2, 2006 using a DIALOG search.*

* cited by examiner

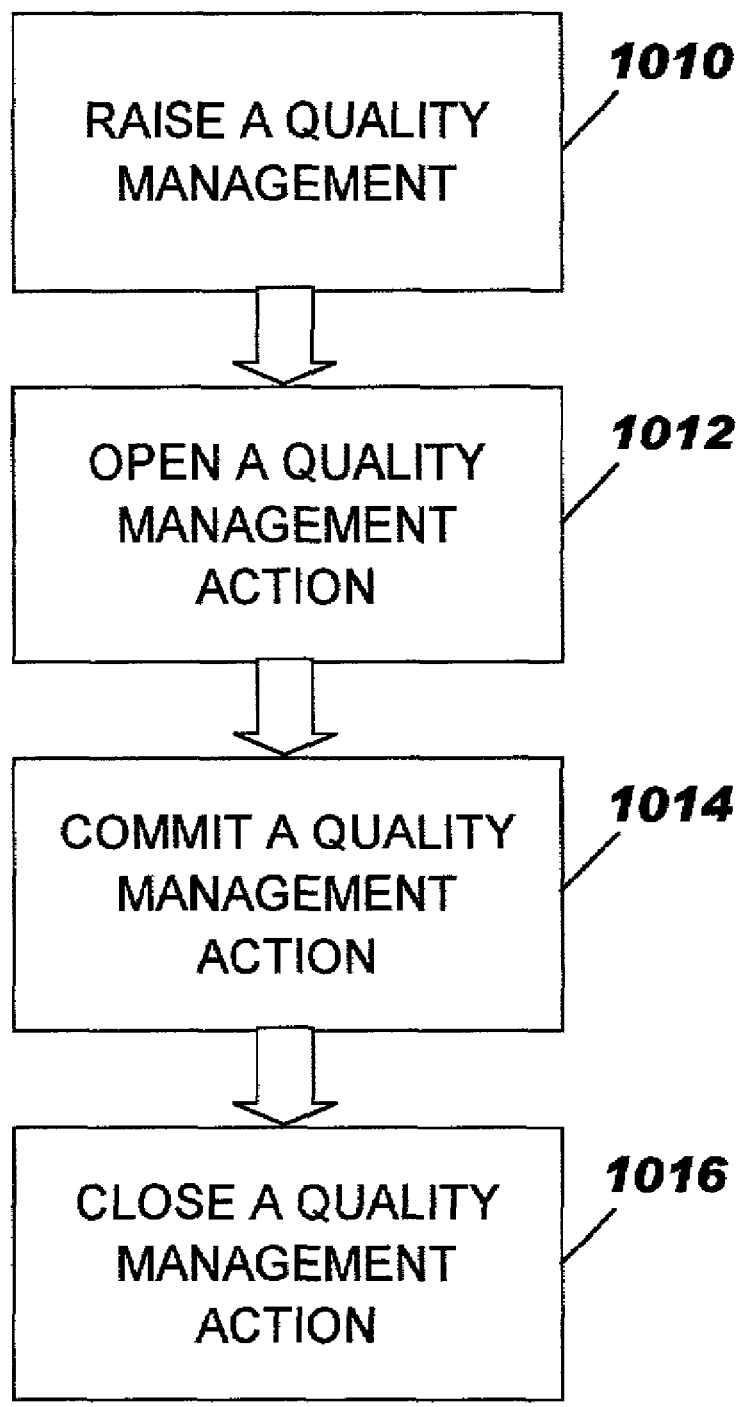

METHOD AND SYSTEM FOR A QUALITY SOFTWARE MANAGEMENT PROCESS

FIELD OF THE INVENTION

The present invention relates to software management, and more particularly to a quality software management method and system.

BACKGROUND OF THE INVENTION

Software has become a fundamental element in the development of most projects. In the past, for small and medium-sized installations, software development was under the control of a relatively small team who managed the overall software development strategy.

Today, however, difficulties arise for complex and large-sized organizations when heterogeneous teams work together, i.e. teams of different sizes, located in distant geographies, using multiple technologies, wherein several software developments are conducted in parallel and integrated in a common system, and for which the workflow of information is dynamically managed.

As an example of a complex project, it is useful to consider the "Space Program". This program is of enormous complexity, and includes building and delivering component modules of the space station, delivering the modules to the site in space, assembling the modules, and training astronauts in the operation and maintenance of the assembled space station. The modules are distributed over many geographical sites in different countries of the world, and in space.

Another example of a complex project from the commercial arena is the creation of a global e-business service, or the transfer of the commercial activity of a large corporation to the worldwide market using the internet and e-commerce.

A further example is the organization of a large-scale sporting event, such as the Olympic Games. Among thousands of actions, the project includes delivering a technological infra-structure, computer system applications, telecommunications systems, and also training and deploying staffs, defining processes for the collection and dissemination of scores to the media for the duration of the sporting events, the whole project being conduct under very tight schedules.

Software Management is a recognized knowledge area in major industrial and commercial activities, and covers several management disciplines such as Project Management or Risk Management, each having its own tools and methods of analysis.

Another discipline of concern is Software Quality Management. Software Quality Management has been defined in the literature as being the concepts, methods, techniques, procedures, and standards for producing high-quality software products in an efficient and cost-effective manner.

Some Software Quality Management methodologies exist, such as the Capability Maturity Model (CMM) from the Software Engineering Institute (SEI) at Carnegie Mellon University in Pittsburgh, or the Rational Unified Process (RUP) from Rational Software Corporation in California.

However, none of the existing methods adequately address the complexity encountered in large-scale projects. Mature and accepted software quality management methodologies for large technology programs do not exist, nor do methods for the dynamic management and integration of the workflow.

Therefore, the present invention is directed towards solving these problems.

SUMMARY OF THE INVENTION

It is an object of the present invention to provide a Quality Management framework integrated with everyday work tools.

It is another object of the invention to provide a method and system to be easily deployed in any heterogeneous development environment of any software development organization or project.

It is yet another object of the present invention to provide a method and system to dynamically improve the workflow processes of any software development organization or project by operating feedback actions.

It is a further object of the present invention to provide a system and method to produce consistent and structured reports including data related to each process of the project.

The objects are achieved by a quality management framework system including a plurality of computer implemented tools accessible by the users for operating a plurality of quality processes. Data relative to the quality processes is collected and aggregated to generate a plurality of respective quality reports. Process defects are detected through a defect prevention tool, and quality actions are initiated in a feedback quality management action tracking process.

In a preferred embodiment, a computer implemented method for operating a quality plan in a product development organization comprising a plurality of members and having quality objectives for product development projects, comprises the steps of:

defining a set of quality processes adapted to the quality objectives required by the organization;

defining a set of computer implemented quality tools to collect data relative to the product development projects, said quality tools comprising at least a database to store the collected data;

for each quality process, aggregating a set of the stored data to generate a respective quality report;

analyzing each quality report to detect problems in the product development projects; and using the results of the analyzing step to initiate actions to resolve the problems detected, thereby improving the quality of the product development projects.

The invention further provides a method for operating a quality plan wherein the set of quality processes are preferably:

a tracking process for identifying issues or change or risk items in the product development projects;

a meeting set-up and reporting process for preparing and conducting meetings between a plurality of the organization's members;

a daily headlights reporting process for allowing short communications between the organization's members;

a documentation process for reviewing and accepting documents generated by the product development projects;

an inspection process for determining deliverables generated by product development projects to be reworked; and a metrics process for producing metrics for data relative to the product development projects.

The novel features believed to be characteristic of this invention are set forth in the appended claims. The invention itself, however, as well as these and other related objects and advantages thereof, will be best understood by reference to the following detailed description to be read in conjunction with the accompanying drawings.

BRIEF DESCRIPTION OF THE DRAWINGS

FIG. 10 is a flow chart of the Quality Management Actions Process of the invention.

DETAILED DESCRIPTION OF THE INVENTION

Figure 1:
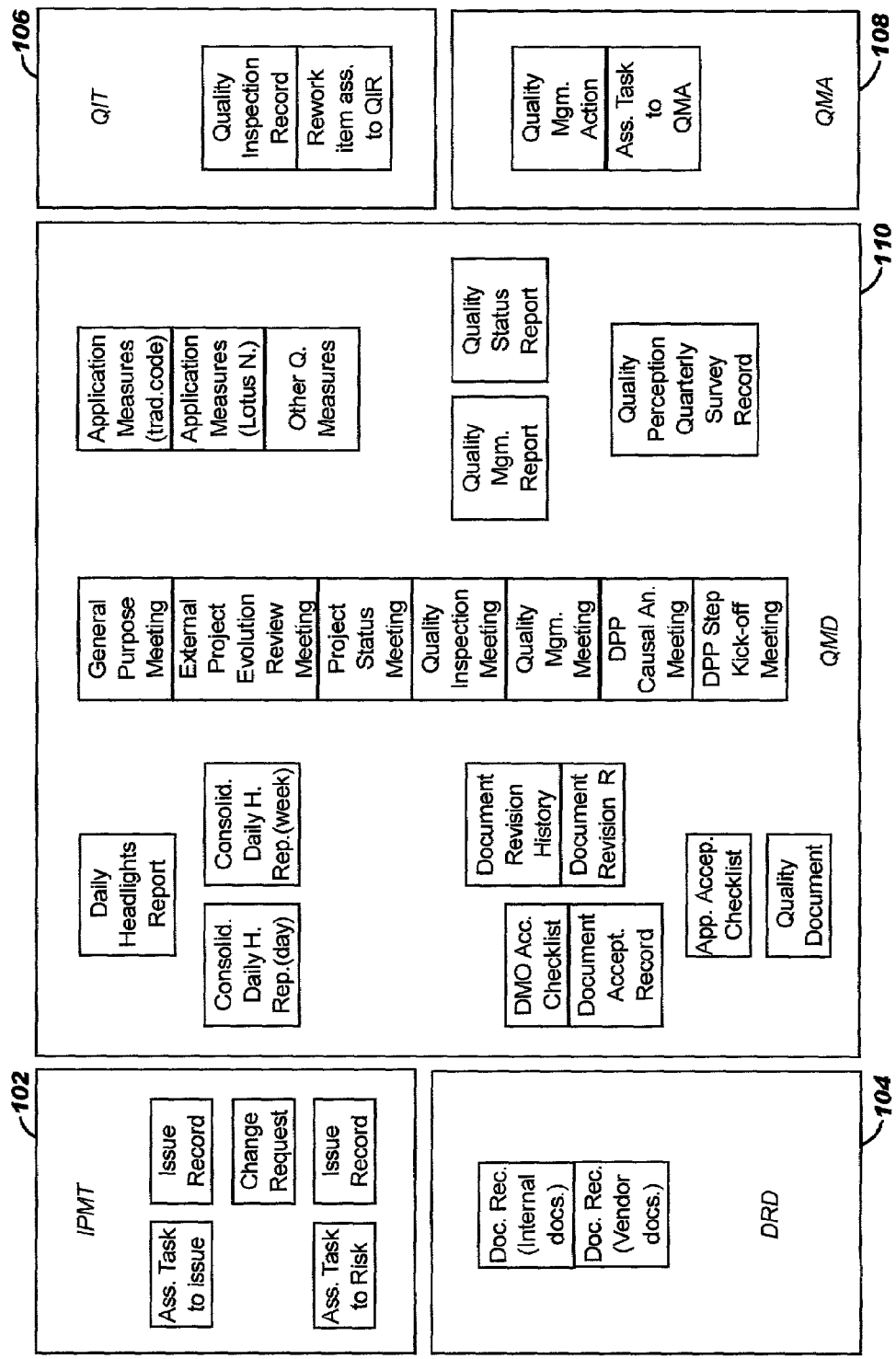
FIG. 1 is a general view of the database used to store the information generated by the different processes of the invention.

The present invention is described with reference to a specific example of a complex project, namely supporting Olympic Games by a Software Development Organization 'SDO'. To put the size of the program that supports the Olympic Games in perspective, it is useful to mention certain statistics concerning the Year 2000 Olympic Games held in Sydney, Australia. About 10,300 athletes competed in 28 sports conducted over 640 morning, afternoon, and evening sessions at 30 venues. In addition to the athletes, there were 5,100 officials, 50,000 volunteer workers, and 12,000 accredited media representatives. The broadcast audience was estimated to be 3.5 billion. The main stadium, at which the Athletics were conducted, has a capacity of 110,000 spectators.

In terms of computing and telecommunications resources, 80 IBM MQ series servers and 3 IBM S/390 mainframes were deployed. Additionally, there were 17,000 desktop and portable computing devices in use, as well as numerous other peripheral devices such as printers, validators, and displays. An estimated 13 million lines of program code were written to implement all the necessary applications, with numerous actors involved.

Before describing the system of the invention, and as a guide to what follows, some terms employed in this document are first defined:
  a problem: any issue, defect or trouble. To solve a problem, a Quality Action is created;
  an issue: a problem in the Project Management, such as a delay in delivery, a lack of resources, or a financial issue. An issue is handled by an Internal Project Management Tracking process;
  a defect: a problem in the product reported by a Test Team to be subjected to a Quality Inspection;
  a trouble: a problem in a single team such a Project Team due to process disadjustments, miscommunication, or lack of skills. A trouble is reported as a Quality Action Proposal or in a Project Status Meeting.

The Quality Management Framework 'QMF' system of the present invention is defined by processes and tools to be used by heterogenous teams that must work together. Heterogeneous means of different sizes, using different technologies, and having different schedulings or development processes. To operate the QMF system, several kinds of Teams or Offices are defined:
  The Project Management Office 'PMO', which is responsible for the Product and Project Planning;
  The Documentation Management Office 'DMO', which is responsible for Documentation Management and its associated processes (the Documentation Review Process and the Documentation Acceptance Process, which are described below);
  The Quality Management Office 'QMO', which is responsible for defining and controlling Quality by creating appropriate processes and tools which support Quality Management; and the Project Teams 'PT', which are responsible for development, support, and test activities for a clearly defined set of deliverables or functions to be implemented as subprojects. From the Quality standpoint, the 'PT' create and own Quality Plans in order to achieve the Quality Management objectives defined by the Quality Management Office. The 'PT' are, for example, an Infrastructure & Operations Team, a Laboratory Setting & Support Team, a System Integration Testing Team, an Architecture & Technology Team, a Development Team, and a Product & Project Management Team.

To be more precise on the role of the actors of the Organization, the Project Management Office 'PMO'is responsible for:
  defining the main requirements of the Project (the "Product Management");
  producing and controlling the Development Plan and Test Plan;
  allocating resources for the Project tasks; and
  controlling costs of the Project.

The Documentation Management Office is responsible for:
  defining the documentation workflows; and
  ensuring that the teams conform to the workflow.

The Quality Management Office is responsible for:
  designing a Quality Master Plan;
  helping the Project Teams in writing their own Quality Plans, and certifying the Quality Plans according to the Quality Master Plan criteria;
  designing an End-to-End Quality Plan;
  controlling continous improvement of the Quality Plans design and implementation; and
  applying a method for deploying the Quality Management System in an Organization.

The QMO performs additional tasks in order to promote the concept of Total Quality. Such extra actions may be to:
  educate the teams on how to implement their Quality Plans;
  provide periodic reports, in addition to reports generated by request;
  establish continous and direct communication with the Project Team Leaders in order to help and improve Quality Management; and
  organize ad-hoc Quality reviews when the established control parameters fall out of the objectives.

The Project Teams are responsible for:
- designing the Project Team Quality Plans;
- producing the Quality Workproducts agreed in the Quality Plans; and
- implementing the Preventive or Corrective Actions agreed when applying the Quality Management Procedures designed in the Quality Plans.

On top of a Quality Management system, a Quality Master Plan is defined for the overall Quality Assurance of the Project. The Master Plan consists of defining the roles and responsibilities of the actors, the main schedule, and the common tools and techniques to be used. To document the Quality Management system, several documents are created:

Quality Master Plan Document: This document describes the general Quality Policy and Plans.

Project Teams Quality Plan Documents: These documents detail how every team implements the Quality Master Plan recommendations.

End-to-End Quality Plan Document: This document details how to achieve Customer Satisfaction (considering Customers in a wide perspective, i.e. external customers, internal customers, and end users) and Quality across the project.

Quality Management Database Document: This document describes the QMD database and other related databases wherein measures and controls are stored and shared.

Preferably, the Project Teams Quality Plan and the End-to-End Quality Plan contain several sections:
- a Project Description, which is a brief description of what the Organization is going to produce for the Project, how it is organized, and the names and contacts of the persons responsible for the different areas,
- a Process Description that describes all the processes within the corresponding Organization. Preferably, there is a description of the phases, the activities within the phases, and the tasks within the activities. A complete description of the actors, the concrete tasks, and the input and output workproducts between activities may be provided as well. In addition, the Process Description may specify which concrete tasks in the different activities are Quality Actions,
- a tools inventory to list the tools used in the processes, customer satisfaction requirements,
- and other sections such as measurements, goals, or risks and dependencies.

In a preferred embodiment, the 'QMF' system of the invention is launched in a new Organization or Project, with the advantage of building the culture of use at the same time that the tool is developed. This reduces resistance to new methods and allows better adaptation of the different components to real needs. In another embodiment, the system of the invention is adapted to existing Quality control procedures of an organization.

As already explained, the 'QMF' system of the present invention includes processes and tools. Before describing the different processes, the tools are now explained with reference to FIG. 1.

FIG. 1 shows the set of databases 100 used to store the information generated by the different processes of the QMF system. It is to be appreciated that these databases are shown on a unique system for simplicity of description rather than limitation. The databases could be distributed on several systems or on any other configuration of remote servers.

A first database 102 stores data related to the Internal Project Management Tracking process, the 'IPMT' database. A second database 104 stores data related to the Documentation process, the 'DRD' database. A third database 106 stores data related to the Quality Inspection Tracking process, the 'QIT' database. A fourth database 108 stores data related to the Quality Management Actions process, the 'QMA' database. Finally, a fifth database 110 stores data related to the Meeting Set-up and Reporting process and to the Metrics process, and has respective connections with the other databases. This fifth database 110 is designated as the Quality Management Database 'QMD' in the description.

Each database comprises a plurality of records created during the process operations, as will be further detailed for each process. The databases are preferably accessible through a user friendly interface, such as the Lotus Notes Graphical User Interface (GUI) from Lotus Corporation, and offer the user several views of the concerned process and/or of associated processes. The views are accessible through standard buttons in a navigation area.

Figure 2:
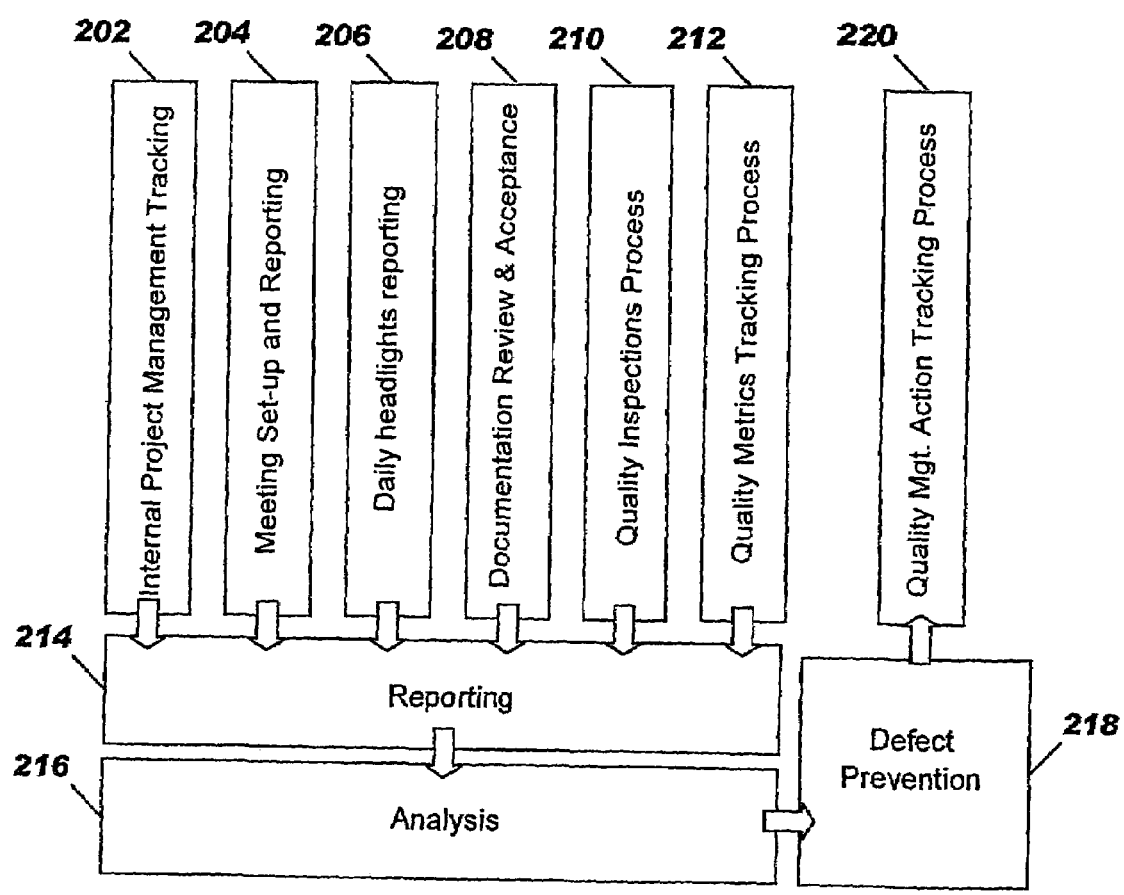
FIG. 2 is a diagram representing a sequence of quality processes to operate the method of the invention.

FIG. 2 is a diagram representing a sequence of quality processes to operate the 'QMF' method of the invention. The method includes operating several processes numbered 202 to 212 during which data from the Project Teams activities are collected. Although six processes are shown in FIG. 2, any other higher or lower number could be operated depending on the structure of the Organization. A significant advantage of the Quality Management Framework of the present invention is that it allows such flexibility, the only requirement being to implement the QMF on a common or integrated platform.

A reporting activity 214 generates quality reports from the data collected. The quality reports are analyzed in an analyzing activity 216, and problems are tracked in a defect prevention process 218. The results of the prevention process 218 feed a quality action process 220 to initiate specific actions to improve the Quality Plan.

Each process is now described in more detail, and for sake of clarity, the same descriptive formalism is applied to each. First, a definition of terms is given; next, the roles of the main actors are defined; then detailed descriptions of the process and the associated tools are given.

Description of the IPMT Process:

The first process 202, namely the Internal Project Management Tracking Process 'IPMT', tracks Issues or Risks or Changes in the different projects.

Definitions for IPMT Process:

Issue Management: a process to ensure that all issues are fixed with minimum impact to the project. This system covers:
- the identification and the capture of each issue;
- the appointment of an action manager to be responsible resolving each issue as soon as possible and in the best way; and
- the logging and periodic reviews of all outstanding issues.

Risk Management: A risk is defined as a possible undesirable and unplanned event that could result in the project's not meeting one or more of its objectives. The objectives of the Risk Management procedure are:
- To identify those risks that may impact the project;
- To build a Risk Containment Plan as the basis of the Risk Management Procedure;
- To ensure that each risk is analyzed for probability and impact;
- To ensure that there is an agreed containment plan for each risk. The plan might be "no action";

To identify an appropriate individual contingency plan, as part of the containment plan, for high risks;

To allocate ownership for the risk and its containment plan to an Action Manager;

To establish and monitor a procedure for reviewing and evaluating risks on an on-going basis, adding new risks, removing obsolete risks, and updating current risks; and To report the status of current risks to the appropriate authorities; for example to a Board of directors.

Change Management: during the projects, decisions are made to optimize the code or to improve functionality. These may imply changes in the initial requirements. Such changes may impact the initial specifications, planning, schedule, and people involved in the project, even though specified by the contract (terms and conditions, documents, deliverables, costs, and so on). The right analysis, control, and tracking of all requested changes (accepted, postponed, or even rejected changes) will enable precise estimation of their impact upon the whole project. The objective of this is to avoid the non-fulfilment of schedule and cost. The objectives of the Change Management procedure are:

To manage each request for change to ensure that the scope of the Project is kept under control;

To ensure each request for change is assessed by key project players;

To allow each change to be accepted (or rejected or deferred) by the appropriate authority;

To enable the orderly implementation of each accepted change;

To allow the impact of all changes to be understood and managed, according to the specific characteristics of the Project;

To allow small changes to be managed with the minimum of overhead.

To Raise an Issue/Risk/Change: To open one of these processes in the respective database. This activity can be done by any project member.

To Analyze an Issue/Risk/Change. After opening it in the database, it is assigned an Action Manager, an Actioner, or a Responsible (for issue, risk, and change), a Priority, and a Target Date. The item is monitored by the Project Team Leader responsible for its solution.

To Close an Issue/Risk/Change. The decisions taken to resolve the Issue, Risk, or Change Request are communicated to every member of the project, and the item is accepted as resolved and closed. This might trigger a Quality Management action.

Roles for IPMT Process:

SDO member. Any person working for the Software Delevopment Organization.

Project Status Group. Attendees to the Project Status Meetings. Typically, these are the Project Team Leaders and the Software Development Organization Board of Directors.

Project Team Leader. The person responsible for managing a Project Team in the Software Development Organization.

Issue/Risk/Change Actioner. The person responsible for implementing or controlling the implementation of the necessary tasks in order to be able to close the Issue/Risk/change.

Detailed Description of the IPMT Process:

The Project Management Office in the Software Development Organization is responsible for controlling the evolution of the project in terms of objectives achievement, scheduling, and delivering. In this context, they focus on Issues Tracking, Risks Tracking, and Changes Tracking. These topics are reviewed based on information stored in an Internal Project Management Tracking Database. Preferably, the database is implemented in the form of three databases: one for Issues, one for Risks, and one for Change Requests. Specific logic is also implemented to support automatic procedures for communicating status changes to the interested parties and for creating lists of opened and closed issues/risks/change requests for reporting and management purposes in the 'PMO'.

The content of each database includes records for all the Issues, the Risks, and the Change Requests. Every record is independent, and contains in dedicated fields the relevant information including, but not limited to, history, status and pending actions.

The following tables 1 through 5 show the Issue/Risk/Change records example and the associated task.

TABLE 1

Issue Record

| Fields | Description |
| --- | --- |
| Raised by | Name and role of the person who raised the Issue |
| Date raised | Date of request |
| Number | A conventioned number |
| Issue type | Solvable by PM or To be escalated |
| Status | Open, Closed |
| Title | Short description |
| Detailed Description | Long description |
| Priority | High, Medium, Low |
| Resolution | Of the issue - Actions to be taken |
| Target Date | DD/MM/YY |
| Action Manager | Team Leader responsible for the resolution |
| Impact in | Other related areas (from Software Development Organization and other) |
| Other doc. | (Comments) |

TABLE 2

Associated Task to Issue Record

| Fields | Description |
| --- | --- |
| Project | Project A, Project B . . . |
| Subproject | Subproject 1, Subproject 2 . . . |
| Issue | (Title) |
| Date Raised | DD/MM/YY |
| Action Owner | (Name) |
| Action Target Date | DD/MM/YY |
| Issue Target Date | DD/MM/YY |
| Action Subject | (Title) |
| Description | (Comment) |
| Current Status | Open, Closed |

TABLE 3

Risk Record

| Fields | Description |
| --- | --- |
| Opened by | Name and role of the person who raised the risk |
| Open Date | Date of request |
| Number | A conventioned number |
| Actioner | (Name) |
| Status | Open, Closed |
| Title | Short description |

TABLE 3-continued

Risk Record

| Fields | Description |
| --- | --- |
| Detailed Description | Long description |
| Priority | High, Medium, Low |
| Risk Impact | In percentage |
| Risk Probability | In percentage |
| Evaluation Criteria | (Comments) |
| Risk and Action Cost | (dollars) |
| Containment Plan/Date | Description of the plan and date |

TABLE 4

Associated Task to Risk Record

| Fields | Description |
| --- | --- |
| Project | Project A, Project B . . . |
| Subproject | Subproject 1, Subproject 2 . . . |
| Risk | (Title) |
| Date Raised | DD/MM/YY |
| Action Owner | (Name) |
| Action Target Date | DD/MM/YY |
| Risk Target Date | DD/MM/YY |
| Action Subject | (Title) |
| Description | (Comment) |
| Current Status | Open, Closed |

TABLE 5

Change Request Record

| Fields | Description |
| --- | --- |
| Raised by | Name and role of the person who raise the Change request |
| Date raised | Date of request |
| Number | A conventioned number |
| Client Number | Number assigned by customer |
| Type of change | Contract or Project |
| Status | Open, Closed |
| Title | Short description |
| Detailed Description | Long description |
| Priority | High, Medium, Low |
| Benefits | Description of all needed tasks |
| Impact in | Other related areas (from Software Development Organization and other) |
| Date Required | DD/MM/YY |
| Responsible | (Name) |
| Cost | Comments and dollars |
| Decision | Accepted, Defered, Rejected, Withdrawn |

Figure 3:
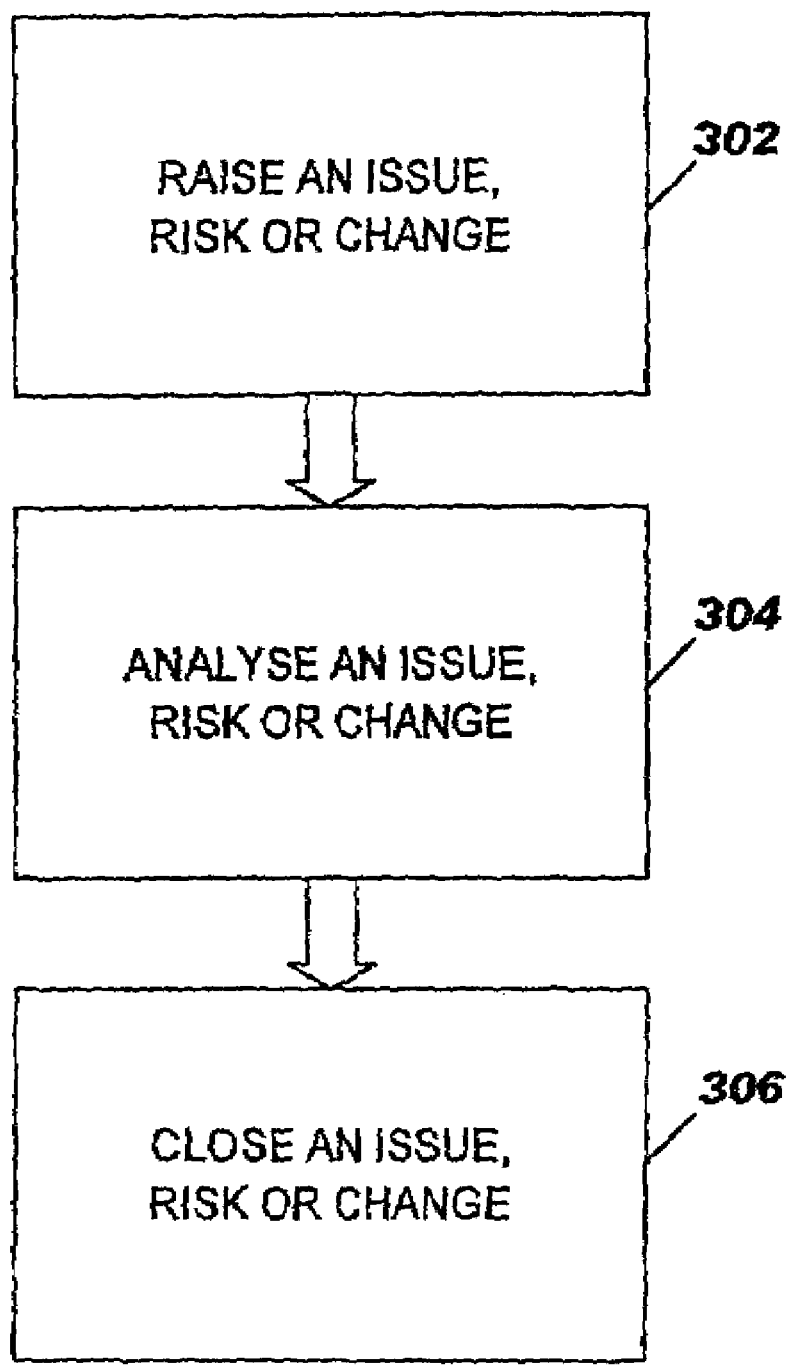
FIG. 3 is a flow chart of the Internal Project Management Process of the invention.

As shown in FIG. 3, the IPMT process begins at step 302 with the task of raising an Issue and/or a Risk and/or a Change. This operation is done during periodic Project Status Meetings bringing together all the Project Team Leaders and Managers. At the beginning of every meeting, responsibility for recording the item is designated, and the corresponding form is completed and stored in the appropriate database.

Step 302 preferably is divided into three tasks as shown in the following table, which shows these tasks in the first left-hand column. The second column indicates the actors that perform the corresponding tasks (an automatic task directly executed by the computer system is mentioned as 'Auto.'). The third column indicates the kinds of inputs used for performing the corresponding task, and the fourth column indicates the outputs resulting from the task:

TABLE 6

Step 302

| TASKS | ACTORS | INPUTS | OUTPUTS |
| --- | --- | --- | --- |
| Create an I/R/C form in the IPMT database | SDO Member | none | An I/R/C with status "Open" |
| Fill Date and I/R/C id in the I/R/C form | Auto. | Date | I/R/C |
| Communicate with Team Leader about the new form created | Auto. | I/R/C | List of I/R/Cs |

The first task is to create an Issue or Risk or Change form in the IPMT database. Next, the date and a number id are automatically indicated, and the Team Leader concerned is informed of the the newly created form.

Going back to step 304 of FIG. 2, the newly created form is analyzed in order to determine the actions needed to resolve the concern. Again, this step is preferably divided into tasks with appropriate actors/inputs and outputs, as shown in the following table:

TABLE 7

Step 304

| TASKS | ACTORS | INPUTS | OUTPUTS |
| --- | --- | --- | --- |
| Review List of I/R/Cs | Project Status Group | List of I/R/Cs | List of I/R/C to be Opened and Closed |
| Assign Actioner, Priority and Due Date for I/R/Cs to be Opened | Project Status Group | List of I/R/Cs to be Opened | I/R/C Opened |
| Close I/R/Cs not to be Opened | Project Status Group | List of QMA Proposals to be Closed | I/R/C Closed |
| Communicate the Opened I/R/Cs to Actioners | Team Leader | List of I/R/Cs Opened | — |
| Design and implement necessary actions to achieve objectives of the assigned I/R/C | Actioner | I/R/C Opened | — |
| Describe list of actions performed for the I/R/C | Actioner | I/R/C Opened | I/R/C Opened + List of Actions Performed |
| Communicate Project Status Group | Team Leader | I/R/C Opened + List of Actions Performed | — |

The last step of FIG. 2 is a closing step 306, which includes the tasks of reviewing the actions to check if the objectives are achieved, and to communicate to the appropriate person the closing decision, as shown in the next table:

TABLE 8

Step 306

| TASKS | ACTORS | INPUTS | OUTPUTS |
|---|---|---|---|
| Review Actions performed and check objectives achieved | Project Status Group | I/R/C Opened + List of Actions Performed | I/R/C Closed |
| Communicate to Actioner and Opener that I/R/C has been closed | Team Leader | I/R/C Closed | — |

The IPMT process is accessible thru a GUI interface, which offers the user several views accessible through standard buttons in the navigation area, such as views by project, by sub-project, by number, by action manager, and by status, as well as special views of opened and closed issues.

In each view, the main parameters of the Issue/Risk/Change record are available with brief descriptions. Associated actions are included as response documents. When a new Issue/Risk/Change is opened, the record includes all the relevant data. The status of the Issue/Risk/Change record automaticaly changes, helping the user to follow the workflow defined by the Internal Project Management Tracking Process.

Figure 4:
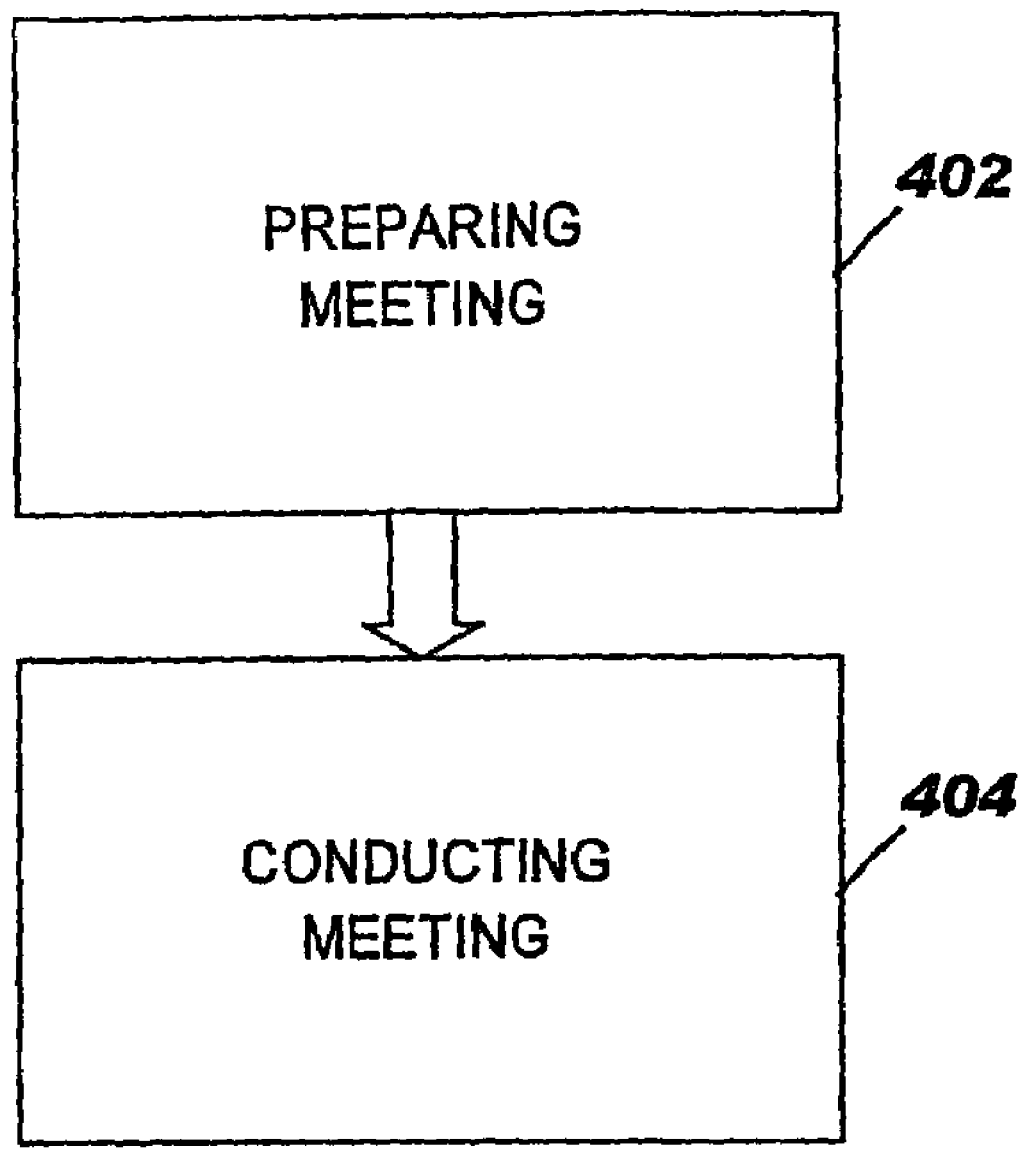
FIG. 4 is a flow chart of the Meeting Set-up and Reporting Process of the invention.

Description of the Meeting and Set-up Process:

Referring back to FIG. 2, column 204 shows a Meeting Set-up and Reporting process, which is described with reference to FIG. 4. This process is identical for every type of meeting, and is used to prepare and report meetings. An actor of the Organization prepares a meeting in step 402 and opens a meeting record in the meeting database 110. The agenda of the meeting is communicated to all participants. When the meeting is held in step 404, the same meeting record is used to store all the information generated during the meeting, including discussed documents. While the meeting is in process, it is possible to automatically generate an action, which may be communicated directly to actioners through an e-mail tool that contains a link to the record reporting the meeting. In this way, each person who needs to complete an action receives all the necessary information in the mail. Afterwards, the actions can be completed and reviewed using the same tools.

Definitions for the Meeting and Set-up Process:
  Preparing a Meeting: this operation includes all required tasks for preparing a Meeting, such as selecting the type of meeting, writing an agenda, selecting the Attendees, distributing material to Attendees, and so forth.
  Conducting a Meeting: a formal process of opening, conducting, and closing a meeting, moderating the Attendees, reporting minutes and conclusions, and creating or updating corresponding records in databases.

Roles for the Meeting and Set-up Process:
  Meeting Initiator: a person who plans a meeting, setting up expectations, agenda, and selecting Attendees.
  Moderator: the person who leads the meeting, keeping in mind the objectives, helping the attendees work as a team, and promoting participation of all Attendees in a way suitable to contribute to the results in a significantly.
  Recorder: a person responsible for capturing and recording the minutes and conclusions of a meeting in the databases 100 of the QMF system. He opens Actions, Issues, and other items upon conclusion of the meeting, including cross references for easier tracking afterwards.
  ttendee: a person who actively attends the meeting and contributes to the results with opinions, conclusions, decisions, or responsibility for follow-on actions.
  Observer: a person who attends the meeting but does not participate actively, and who has no defined role in this process.

Detailed Description of the Meeting and Set-up Process:

As already explained, this process is used for preparing and conducting meetings. The process is the same for all the meetings, except those of the Quality Inspection process and the Defect Prevention process, which will be described later. However, some details may vary from type to type of meeting.

In the first step 402, several tasks are accomplished (on column TASKS) to prepare a meeting, as shown in the following table 9. The 'ACTORS' column indicates the person responsible for executing the task, the 'INPUTS' and 'OUTPUTS' columns respectively indicate the information used and generated for/by the task. Tables appearing in the rest of this document are to be read in the same manner.

TABLE 9

Step 402

| TASKS | ACTORS | INPUTS | OUTPUTS |
|---|---|---|---|
| Select type of meeting, schedule Date, Time and Location for Meeting | Meeting Initiator | — | Meeting Report created |
| Select Attendees and Observers and send invitations | Meeting Initiator | Meeting Report | Invitations sent to Observers and Attendees |
| Distribute Material within Attendees and Observers | Meeting Initiator | Meeting Report, Materials | Materials distributed and linked to Meeting Report |
| Confirmation of attendance | Attendees and Observers | — | Meeting confirmed or cancelled |

First, an agenda is built (date, time, location) and communicated to all appropriate persons, and then the useful material is distributed.

When the meeting is held in step 404, all minutes are recorded in the meeting database 110 by the reporter and, when the meeting is finished, all related data are sent again to the attendees. Table 10 below shows the different tasks of the conducting step 404.

TABLE 10

Step 404

| TASKS | ACTORS | INPUTS | OUTPUTS |
|---|---|---|---|
| Open Meeting | Moderator | Meeting Report | Meeting Report ready to be updated |
| Review Materials | Attendees and Moderator | Meeting Report, Materials | Meeting Report with minutes |
| Discuss Actions | Attendees and Recorder, Moderator | Meeting Report | Actions created, Meeting Report with Actions linked |

TABLE 10-continued

Step 404

| TASKS | ACTORS | INPUTS | OUTPUTS |
|---|---|---|---|
| Conclusions | Attendees and Recorder | Meeting Report | Meeting Report with conclusions |
| Close Meeting | Moderator | Meeting Report | Actions reviewed, Meeting Report reviewed and closed |

The Meeting and set-up process is accessible thru a GUI interface, which offers the user several views of the meetings categorized by type. Each type is accessible through standard buttons in the navigation area to allow creation of an associated meeting record in the Quality Management database 110. The record is displayed as a form to be completed following the required process (Meeting Setup & Review Process, Quality Inspections Process and Defect Prevention Process). The form includes all necessary data to later report the meeting during a reporting process 214, such as date and time, attendees, agenda, and so forth, and may also include links to the reviewed documents in the Documentation database 104, links to the Quality Actions in the Quality Actions database 108, and links to the Quality Inspection Database 106.

In a preferred embodiment, the Meeting GUI interface also offers links for "Reports", "Documentation" and "Quality Measurements" to access other sections of the Quality Management database 110.

The next tables 11 to 14 show examples of reporting records for different types of meetings.

TABLE 11

External Project Evolution Revision Meeting Reporting Record

| Fields | Description |
|---|---|
| Date | DD/MM/YY |
| Board of directors | Executive Team |
| Project Teams affected | Project A, Project B . . . |
| Board of directors Reviewers | (Names) |
| Project Teams Attendees | (Names) |
| Main Topics Reviewed | (List of Topics) |
| Issues, Risks or Changes raised | (References to IPMT) |
| Quality Management Actions identified | (References to QMA) |
| Revision Report Responsible Signature | (Name) |

TABLE 12

Project Status Meeting Reporting Record

| Fields | Description |
|---|---|
| Date | DD/MM/YY |
| Project Teams affected | Project A, Project B . . . |
| Meeting Attendees | (Names) |
| Main Topics Reviewed | (List of Topics) |
| Issues, Risks or Changes raised | (References to IPMT) |
| Quality Management Actions identified | (References to QMA) |
| Meeting Report Responsible Signature | (Name) |

TABLE 13

General Purpose Meeting Reporting Record

| Fields | Description |
|---|---|
| Date | DD/MM/YY |
| Meeting Attendees | (Names) |
| Meeting Room | (Name of meeting room) |
| Agenda - Subject | (List of topics in the agenda) |
| Agenda - Description | (List of descriptions of topics) |
| Miscellaneous | (Comments and attachments) |
| Meeting Responsible Signature | (Name) |

TABLE 14

Quality Management Meeting Reporting Record

| Fields | Description |
|---|---|
| Date | DD/MM/YY |
| Project Teams affected | Project A, Project B . . . |
| Meeting Attendees | (Names) |
| Main Topics Reviewed | (List of Topics) |
| Documents Reviewed | (List of References to QMD) |
| Quality Management Actions identified | (References to QMATS) |
| Meeting Report Responsible Signature | (Name) |

Figure 5:
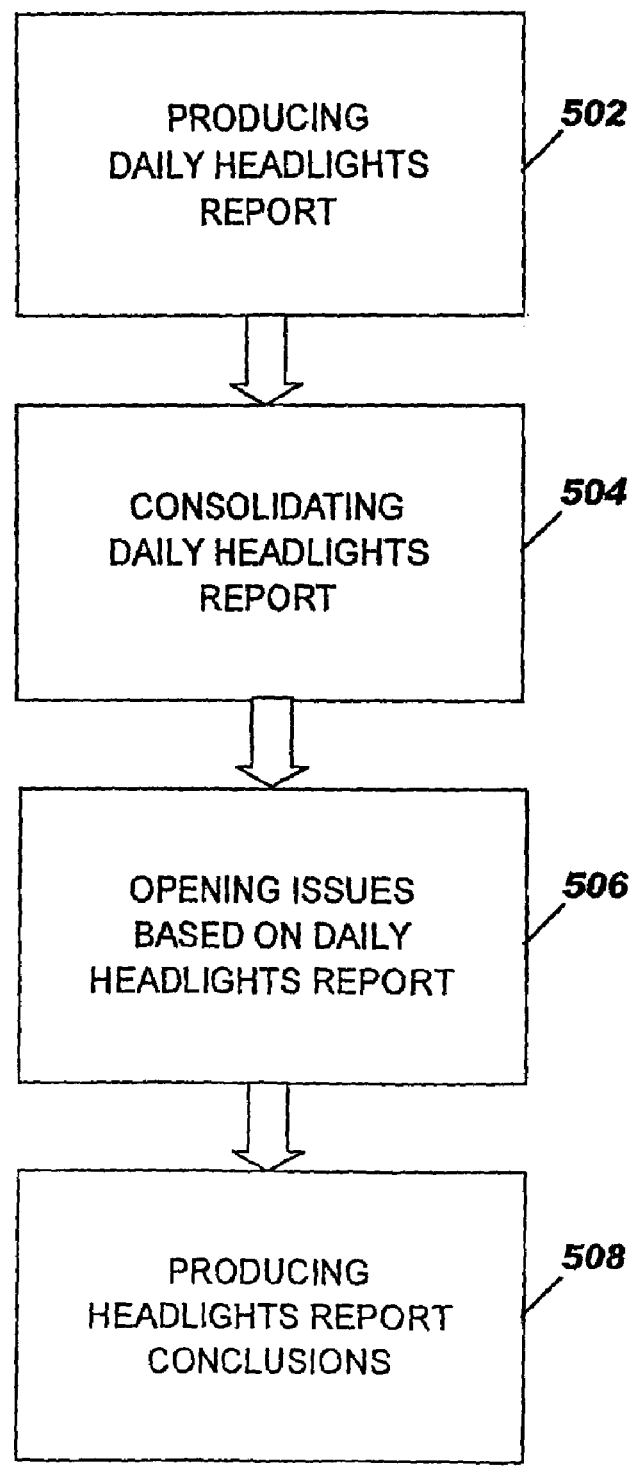
FIG. 5 is a flowchart for producing headlights reports.

Description of the Daily Headlight Reporting Process:

Referring back to FIG. 2, column 206 shows a Daily Headlights Reporting Process, which is now described with reference to FIG. 5. This process consists of a proactive communication of project status from Team Leaders to Executives of the Software Development Organization at a predetermined frequency. In the preferred embodiment applied to the Olympics, the Headlight reports were generated daily, although other frequencies may be used. The contents of the communication are fixed and short, based on predetermined concepts, such as:
  Main achievements of the day;
  Changes to the Plan;
  Help Needed;
  "Things that Keep Me Awake at Night".

Definitions for the Daily Headlight Reporting Process:
  Producing Daily Headlight Report: A Team Leader accesses the Quality Management Database 110 and generates an executive report with all basic Headlights data (defined as Accomplishments, Changes to the Plan or Delays, Help Needed, and "Things that keep me awake at night"). This can be done anytime before consolidation.
  Consolidating Daily Headlight Reports. Every day (at roughly the same time, once the last Reports are accepted for the day), the Quality Management Office consolidates all reports from the teams into a single executive report collecting all the information in the same format. The structure of the Quality Management database provides the report automatically, and sends the report to the executives distribution list.
  Creating Issues based on Daily Headlight Reports. Based on this single report, Executives create proper Issue Records in the Issue database 102, at which point they may take immediate action.
  Producing Weekly Headlight Conclusions. Every week, QMO produces a summary report for executives based on the consolidated daily reports. Part of this summary report is generated automatically, and part requires statistical and manual summarization.

Roles for the Daily Headlight Reporting Process:
   Quality Management Office (QMO). A department within the Software Development Organization, responsible for the quality management of the organization, including the definition, review, and measurement of the organization's processes.
   Project Team Leader. The person responsible for a Project or Sub-project within the Software Development Organization. He is aware of all important data regarding his project, so he is able to report the Daily Headlight. In addition, the person is able to talk with the Executive to clarify the facts reported.
   Executive. A member of the Software Development Organization Board of Directors. He needs to be aware of any issues requiring authorizations or support and coordination from the main organizations. He can answer the requests of the Project Team Leaders. He may be ultimately responsible in an escalation of any issue or exception to the normal processes.

Detailed Description of the Daily Headlight Reporting Process:

The Daily Headlight Reporting Process is intended to give the Team Leaders an opportunity to provide information to the Executives on a daily basis in the following areas: Main achievements, Changes to the Plan, Help Needed and "Things that Keep Me Awake at Night". Daily Headlight reports are sent by Team Leaders or Managers to Executives in order to summarize important information which requires immediate action. Consolidated summary reports are produced by QMO periodically in order to summarize the main concerns in the Organization.

In step 502, a headlight report is produced in QMD. The report is intended to keep Executives aware of Main achievements and/or Changes to the Plan, and also to request help/actions (the Help Needed and/or 'Things that Keep Me Awake at Night'). Other entries could be devised in another kind of Organization, but the principle is that only important information which cannot be communicated by other means may be included in this process. Periodicity of the process may be changed, and a weekly report may be adopted if the volume of information is too large or if the urgency of the requirements by the Team Leaders is not high.

Table 15 below summarizes the different tasks of the daily headlight report producing step 502.

TABLE 15

Step 502

| TASKS | ACTORS | INPUTS | OUTPUTS |
|---|---|---|---|
| Create Daily Headlight Report in 'QMD' | Project Team Leader | — | Daily Headlight Report |
| Fill in & submit: Main achievements Changes to the Plan (or Delays) Help needed "Things that keep me awake at night" | Project Team Leader | Daily Headlight Report | Daily Headlight Report filled in |

In step 504, the daily headlight reports are consolidated. A consolidated headlight report record is created in 'QMD' and the report is send to the Executives. Table 16 below summarizes the consolidation step 504. Table 17 shows an example of a consolidated headlight report record.

TABLE 16

Step 504

| TASKS | ACTORS | INPUTS | OUTPUTS |
|---|---|---|---|
| Run consolidation process and send report to Executives | QMO | List of Daily Headlight Reports | Consolidated Report sent by mail to executives |

TABLE 17

Consolidated Headlight Report Record

| Fields | Description |
|---|---|
| Date | DD/MM/YY |
| Comments | (General Comments) |
| Owner | (List of Names) |
| Accomplishments | (List of Comments) |
| Delays | (List of Comments) |
| Changes to the Plan | (List of Comments) |
| Help needed | (List of Comments) |
| Comments | (Comments of every team) |

After the consolidated report is sent to the Executive, and if the Executive approves, an Issue is created in the Issue Database 102 in step 506. Notification is sent to the appropriate concerned actors along with a reference or a direct link to the Issue record. Table 18 below summarizes the Issue creation step 506.

TABLE 18

Step 506

| TASKS | ACTORS | INPUTS | OUTPUTS |
|---|---|---|---|
| Study Consolidated Report and open Issues in the 'IPMT' DB | Executives | Consol. Report | Issues opened in 'QMD' |
| Notify Issues opened to interested parties | QMO | Issues opened | E-mail notif. with Issues linked |

Finally, in step 508, all the consolidated reports over a week are aggregated to generate a conclusion report. A corresponding record is created in 'QMD'. Table 19 below summarizes the headlight conclusion step 508. Table 20 shows an example of a conclusion record.

TABLE 19

Step 508

| TASKS | ACTORS | INPUTS | OUTPUTS |
|---|---|---|---|
| Produce statistics and report based on Consolidated Reports of the week | QMO | Consolidated Reports, Issues opened | Weekly Report |

TABLE 20

| Fields | Description |
| --- | --- |
| | Conclusion Record |
| Date | DD/MM/YY |
| Accomplishments | (Consolidated Comments) |
| Delays | (Consolidated Comments) |
| Changes to the Plan | (Consolidated Comments) |
| Help needed | (Consolidated Comments) |
| Comments | (Consolidated Comments of every team) |

The Daily Headlight and Reporting process is accessible thru a GUI interface, and offers the user several links to access the type of report to be created in the Quality Management database 110.

Description of the Documentation R&A Process:

Referring again to FIG. 2, column 208 shows a Documentation Review and Acceptance (R&A) process to be immediately described with reference to FIGS. 6-*a* and 6-*b*.

Definitions for the Documentation R&A Process:

The Documentation Repository Database (DRD) is a repository of records of the documents created as part of the Project. Some of these records have a corresponding document file stored also in DRD, while others indicate that the document file is located in another repository.

A vendor is a subcontractor who provides the Software Development Organization with software and related documentation as part of the Project.

A document workflow is a process by which a draft or a vendor draft becomes a Document Version or Vendor Document Version, respectively. The workflow is determined according to who distributes and who receives the document in question.

A document draft is a document that is "in the works"; that is, it is a document that has commenced its workflow but has not yet reached its final version.

A Document Version is a document that has already gone through the whole document workflow, resulting in its final distribution. A distinction is made between Document Versions (Software Development Organization documents) and Vendor Document Versions (vendor documents).

The DMO Acceptance Checklist is an electronic form that the DMO uses in order to verify whether or not a vendor document complies with certain fundamental criteria that the DMO believes important for the distribution of a Vendor Document Version.

A document ID is a document's unique label; it is created and used for easy document identification and library management purposes.

Roles for the Documentation R&A Process:

Author. A person who writes a document; also, the name given to the person who creates a Documentation record in DRD.

Reviewer. A person who checks a document for technical or functional errors.

Editor. A person who reads a Software Development Organization document and provides comments about its structure, grammar, and punctuation; also, a person in the DMO who provides comments about the Vendor Draft and completes the DMO Acceptance Checklist.

Approver. A person who ratifies the Approval Draft of a Software Development Organization document and gives the sign-off for its distribution.

Acceptor. A person who ratifies a Vendor Draft and gives the sign-off for its distribution.

Documentation Management Office (DMO). A department within the Software Development Organization that is responsible for establishing and implementing documentation processes and procedures. The DMO participates in the establishment of these processes and procedures by creating document templates and user guidelines. At the same time, it participates in the implementation by taking part in the Review Process (Software Development Organization documents) and the Acceptance Process (vendor documents).

Detailed Description of the Documentation R&A Process:

Every document that is written as part of the Project must be planned and accounted for. Project Team Leaders and Project Leaders record the documents that they plan to distribute using a template located on 'QMD' and called here the Documentation Plan Template.

The team's documents are produced either by someone from the Software Development Organization or by a vendor. By reading a Project Team's documentation plan, other Software Development Organization teams know when that team's information will become available. In particular, the DMO uses each Project Team's documentation plan as a guide for scheduling editorial reviews (Software Development Organization documents) as well as DMO Acceptance Checklist completion (vendor documents).

The documents managed by the Software Development Organization are classified based on two principal criteria:

Who distributes the document; that is, the department or company that produces the document; and Who receives the document; that is, the department or company to whom the document is delivered.

Applying these criteria leads to several document workflows:

W1 for documents delivered to the Software Development Organization by the Software Development Organization;

W2 for documents delivered to other Organizations in the same Company that are produced by the Software Development Organization;

W3 for documents delivered to a customer and that are produced by the Software Development Organization; and W4 for documents delivered to the Software Development Organization, to another Organization in the same Company, or to a customer, and that are produced by a vendor.

The Documentation Management Office defines a Documentation Review Process which includes a review workflow for all internally produced documents. Every time a document is created or reviewed, a Document Review Record is stored in the Quality Management Database 110. These records are consolidated in the proper Documentation Quality Report.

The Documentation Management Office also defines a Documentation Acceptance Process which includes an acceptance workflow for all externally produced documents. Every time a document is created or reviewed, a Document Acceptance Record is stored in the Quality Management Database 110. These records are consolidated in the proper Documentation Quality Report.

Finally, the Documentation Management Office creates a dedicated database to store all documents handled in the organization, the Documentation Repository Database (DRD) 104. As reviews and acceptance processes are Quality processes, some references to Quality Records regarding documentation reviews are stored in the Quality Management Database 110 and linked to the Documentation Repository Database 104.

Figure 6A:
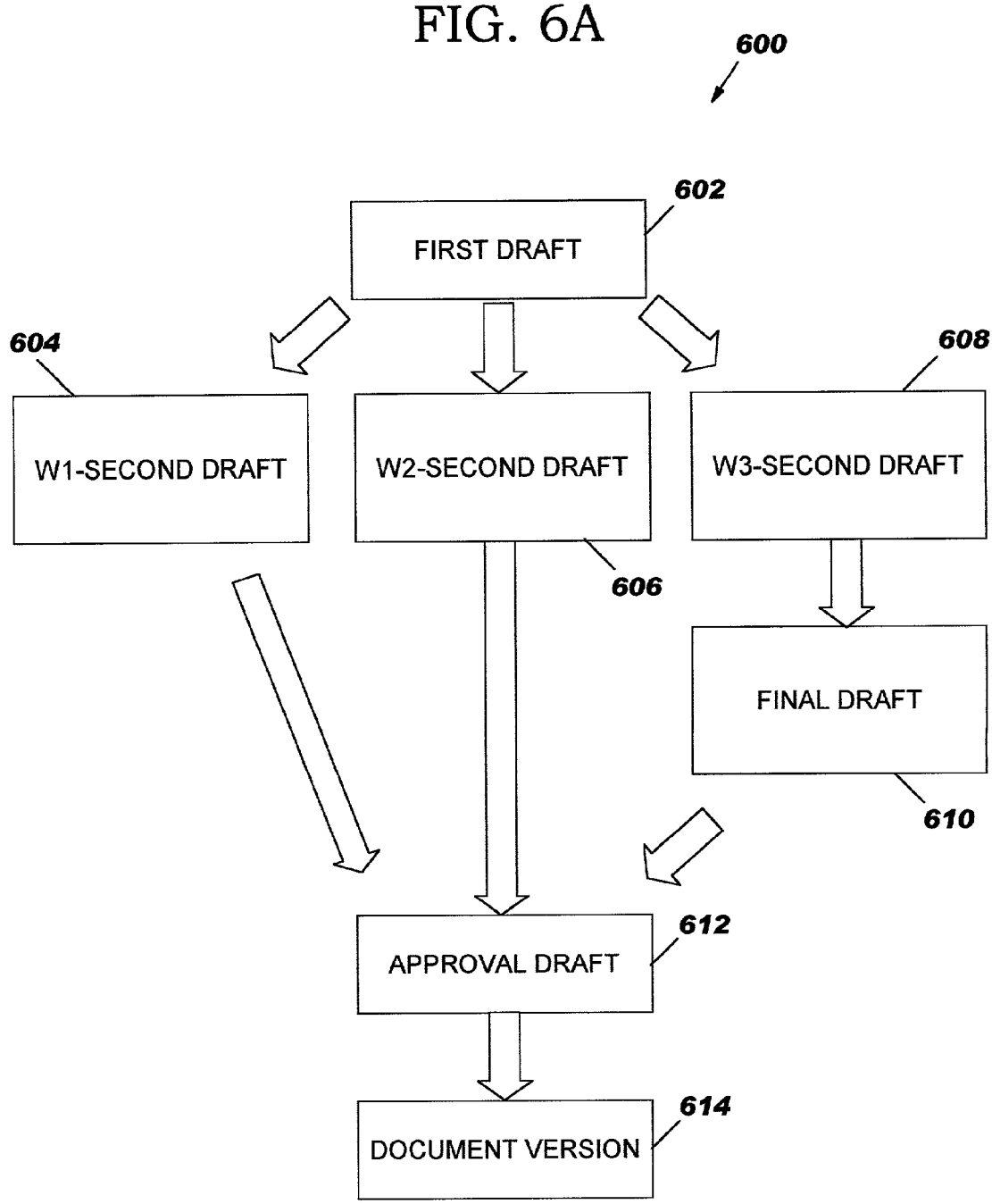
FIG. 6A is a flow chart of the Documentation Review Process of the invention.

Referring now to FIG. 6A which shows the steps of the Review process 600, the process begins with step 602 wherein a first draft of a document is reviewed. Table 21 below details the tasks of the first draft review step for workflows W1, W2 or W3 with the actors and the associated actions.

TABLE 21

Sep 602

| TASK | ACTOR(S) | ACTION(S) |
|---|---|---|
| Storing a First Draft | Author & DMO | Author asks DMO for document ID DMO provides author with document ID Author creates a Documentation record in 'QMD'. Author checks that document displays First Draft status. |
| Reviewing a First Draft (technical review) | Team Leader, team members and members of other Architecture & Development teams acting as reviewers | Those specified by the author read and provide comments about the document. |
| Updating a First Draft | Author | Updates the First Draft with the comments provided by the reviewers. |

In steps 604, 606 and 608, the first draft document is reviewed and called a second draft. Tables 22 and 23 below detail the tasks of the second draft review for each document type (workflow W1 or workflow W2/W3).

TABLE 22

Setp 604 for workflow W1

| TASK | ACTOR(S) | ACTION(S) |
|---|---|---|
| Storing a Second Draft | Author | Updates the attachment (if one exists) within the Documentation record in DRD; Checks that document now displays Second Draft status. |
| Reviewing a Second Draft (technical check) | Team Leader, team members and members of other Architecture & Development teams acting as reviewers | Those specified by the author check that the new draft level reflects their comments and ensure that it is technically correct. |
| Reviewing a Second Draft (functional review) | Test Team acting as a reviewer | Test Team members provide comments in relation to discrepancies detected between the document contents and application functionality. |
| Updating a Second Draft | Author | Updates the Second Draft with the comments provided by the reviewers. |

TABLE 23

Step 606 or 608 for workflows W2 or W3

| TASK | ACTOR(S) | ACTION(S) |
|---|---|---|
| Storing a Second Draft | Author | Updates the attachment (if one exists) within the Documentation record in the DRD; Checks that document now displays Second Draft status. |
| Reviewing a Second Draft (technical check) | Team Leader, team members and members of other Architecture & Development teams acting as reviewers | Those specified by the author check that the new draft level reflects their comments and ensure that it is technically correct. |
| Reviewing a Second Draft (functional review) | Test Team acting as a reviewer | Test Team members provide comments in relation to discrepancies detected between the document contents and application functionality. |
| Reviewing a Second Draft (editorial review) | Editor | Provides comments in relation to the document's structure, grammar and punctuation. |
| Updating a Second Draft | Author | Updates the Second Draft with the comments provided by the reviewers (and by the editor). |

Alternatively, the editorial review is optional in the second workflow W2.

Following step 608, a final draft review step 610 is added for the documents delivered to customers. Table 24 below details the final draft review.

TABLE 24

Step 610

| TASK | ACTOR(S) | ACTION(S) |
|---|---|---|
| Storing a Final Draft | Author | Updates the attachment (if one exists) within the Documentation record in DRD; Checks that document displays Final Draft status. |
| Reviewing a Final Draft (technical check) | Team Leader, team members and members of other Architecture & Development teams acting as reviewers | Those specified by the author in the draft check for errors introduced during the writing of this draft level Reviewers may ask for small modifications due to last-minute changes in the code. |
| Reviewing a Final Draft (functional check) | Test Team acting as a reviewer | Test Team members check that the new draft level reflects their comments and ensure that it is functionally correct. |
| Updating a Final Draft | Author | Updates the Final Draft with the comments provided by the reviewers. |

An approval step 612 follows Steps 604, 606 and 610 to give approval to the last draft. Table 25 below details the Tasks and the Actors in this step.

TABLE 25

Step 612

| TASK | ACTOR(S) | ACTION(S) |
|---|---|---|
| Storing an Approval Draft | Author | Updates the attachment (if one exists) within the Documentation record in DRD; |

TABLE 25-continued

Step 612

| TASK | ACTOR(S) | ACTION(S) |
|---|---|---|
| Approving an Approval Draft | Approvers | Checks that document now displays Approval Draft status. Those specified by the author approve (or reject) the draft Approvers give sign-off to distribute the document if the document is approved. |

Finally in step 614, the approval draft is stored as a version of document in the DRD database. Table 26 below summarizes the tasks of step 614.

TABLE 26

Step 614

| TASK | ACTOR(S) | ACTION(S) |
|---|---|---|
| Storing a Document Version | Author | Updates the attachment (if one exists) within the Documentation record in DRD; Checks that document now displays Document Version status. |

Figure 6B:
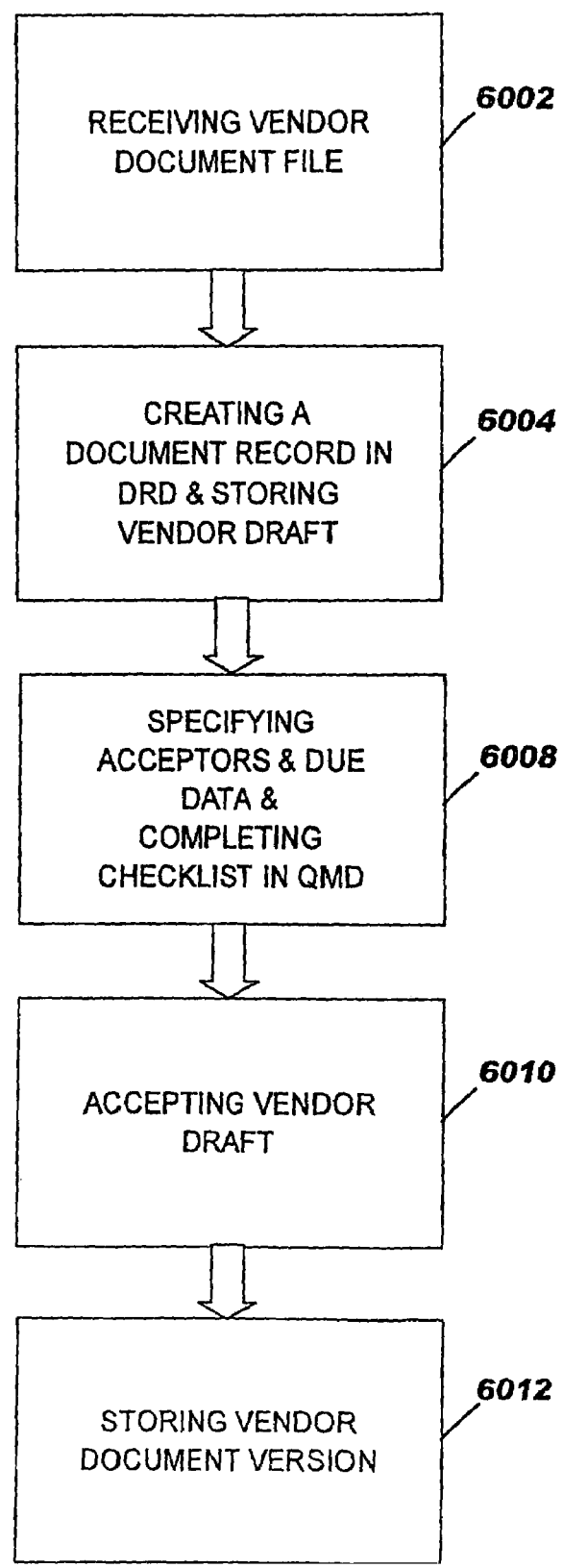
FIG. 6B is a flow chart of the Documentation Acceptance Process of the invention.

Referring now to FIG. 6B, the documentation acceptance process W4 is described. After the document has been received in step 6002, a document record is created in step 6004 in the Documentation Database 104, and the document is stored in DRD. Next, in step 6008, a list of acceptors is defined in QMD, as well as a due date for accepting or not the vendor document.

Step 6010 is the formal acceptance operation realized by the acceptors through electronic answers. The list of acceptors is automatically updated when appropriate.

Finally, if the document has been accepted, the vendor document version is stored in DRD in step 6012. Table 27 below specifies, for each step, the actors and the actions associated.

TABLE 27

Workflow W4

| TASKS | ACTOR(S) | ACTION(S) |
|---|---|---|
| Receiving a vendor document file via electronic mail | PMO Team Leader acting as an author | Receives an electronic file of the vendor document |
| Creating a Documentation record and storing a Vendor Draft | PMO Team Leader acting as an author | Creates a Documentation record on the DRD with an attachment corresponding to the vendor document file Checks that document now displays Vendor Draft status Notifies Project Leader and DMO that document has been received. |
| Specifying Acceptors & Due Date, reviewing the Vendor Draft, and completing checklist in Quality Management Database | DMO acting as editors and those assigned by Software Development Organization Project Leader acting as acceptors | DMO specifies Acceptors (one of them definitely being the Project Leader, others are as requested) and Due Date in appropriate QMD form DMO informs Architecture & Development Manager of acceptor's list DMO editors review the Vendor Draft and fill out the DMO Acceptance Checklist. DMO editors save the completed checklist, located on QMD, which becomes a quality record Additionally, the Test Team (in particular, Lead Testers) may review user documentation together with the code (as per Team Leader request). |
| Accepting a Vendor Draft | Software Development Organization Project Leader acting as an acceptor | Accepts (or rejects) the Vendor Draft. |
| Storing a Vendor Document Version | PMO Team Leader acting as an author | Updates the Documentation record in DRD Checks that document now displays Vendor Document Version status. |

As for the already described process, the documentation Review and Acceptance process is accessible to the user through a user friendly GUI interface.

Description of the Quality Inspection Process:

Referring again to FIG. 2, column 210 shows a Quality Inspections Process 'QIP' which is described with reference to FIG. 7.

QIP is a process that specifies how Quality Inspections are managed within Development and Test teams. QIP is common for all Teams, although each Project Team may customize its own QIP.

The objective of Quality Inspections (QIs) is to find Rework Items. This should result in saving time and effort by preventing defects or issues in subsequent phases of the development life cycle. The focus of QIs is on deliverables, either internal or external, from documentation to source code or executables.

Definitions for the Quality Inspection Process:

Deliverable: a product developed by the author to be inspected during the Quality Inspection process.

Rework item: an action associated with an issue or component containing a defect that prevents the author rework from meeting Software Development Organization standards and client requirements. A Rework Item may also include a potential problem or error that causes the author rework to determine if an actual problem or error exists. Rework Items are stored and tracked using the Quality Inspection Records Tracking System and the corresponding form.

Inspection Materials: an author provides inspectors with inspection materials consisting of the deliverable(s), requirements documents, or other related information.

Planning QI: the first step of the QIP consists of discussing which topics must be included in the QI Meeting. Planning may be regular or periodic.

Preparing QI: all required tasks for preparing the QI Meeting, such as distributing material to Inspectors and creating QI Records.

QI Meeting: the formal process of reviewing Rework Items associated with the opened QI Records. Quality Inspection Meetings results are stored, preferably in QID using Quality Inspection Meeting Forms.

Re-inspecting/Verifying: resolving rework items, and checking that they are actually resolved.

Measuring/Delivering: closing QI Records or including them in the next QI loop.

Roles for the Quality Inspection Process:

Initiator: the person who prepares and distributes inspection materials and completes all rework required. His role may include the following tasks:

| | |
|---|---|
| Before QI | Plans QI |
| | Coordinates with Project Team Leader selecting Participants |
| | Schedules QI Meeting |
| | Prepares & Distributes Inspection material |
| | Reviews Rework Items received from Inspectors |
| During QI | Answers Questions about the Deliverable |
| | Be prepared to address Rework Items |
| | Provides Rework Item resolution date |
| After QI | Performs and submits rework for verification and/or reinspection |
| | Follows up on all Rework Items until they are verified |

Project Team Leader: Ensures the QI process is applied to the Project. His role may include the following tasks:

| | |
|---|---|
| Before QI | Reviews or discuss project QI plans with the author |
| | Ensures compliance with the QI methodology |
| | Assists in the selection of QI participants |
| | Notifies stakeholders of QI milestone |
| During QI | Ensures compliance with the QI methodology |
| After QI | Verifies Rework Items are resolved |
| | Analyzes and reports project's Rework Items and trends at Project Status Meetings |
| | Evaluates the project's QI process and provides input to the QMO as needed |

Moderator: Leads the QI Meeting. His role may include the following tasks:

| | |
|---|---|
| Before QI | — |
| During QI | Meeting Introduction: |
| | Determines if preparation and attendance are adequate |
| | Ensures attendance and preparation time are recorded |
| | Verifies roles and QI understanding |
| | Introduces materials to be inspected |
| | QI Meeting Management: |
| | Ensures participants work as a team |
| | Keeps meeting objective, professional, and friendly |
| | Avoids needless criticism and discussions of "style" |
| | Directs the recording of Rework Item information |
| | Rules on unresolved problems |
| | Keeps the meeting moving |
| | Ensures that any failure to inspect is reported |
| | Contributes as an inspector |
| | QI Meeting Conclusion: |
| | Summarizes the results |
| | Directs the Recorder to review all Rework Items |
| | Gains final consensus on problems |
| | Assigns inspectors for verification responsibilities |
| | Determines if reinspection is needed |
| After QI | — |

Reader: Reads or paraphrases sections with Rework Items. His role may include the following tasks:

| | |
|---|---|
| Before QI | Prepares for session by pre-reading and paraphrasing |
| During QI | Paraphrases documents or review code as directed by the Inspection Team |
| | Maintains the pace of the meeting |
| | Presents material with clarity and understanding |
| | Contributes as an inspector |
| After QI | — |

Inspector: Reviews distributed information and documents potential Rework Items. His role may include the following tasks:

| | |
|---|---|
| Before QI | References QI Checklists as well as team or personal reference material |
| | Inspects the Deliverable(s) |
| | Ensures Author receives Rework Items prior to the QI |
| During QI | Explains Rework Items provided to the Author |
| | Identifies additional Rework Items at the meeting |
| | Highlights positive product characteristics |
| | Avoids discussing 'style' differences |
| After QI | Verifies re-work as assigned |
| | Participates in re-inspection as necessary |

Recorder: Records Rework Items and Inspection Summary Information. His role may include the following tasks:

| | |
|---|---|
| Before QI | — |
| During QI | Updates QI record for Rework Items and meeting results when practicable and available |
| | Records Rework Items and meeting results during the session on the QI Meeting Report if needed. |
| | Contributes as an inspector |
| After QI | Provides the Author with legible reports as needed |

Initiator's Direct Manager: may be an additional role for the Project Team Leader, which may include the following tasks:

| | |
|---|---|
| Before QI | Establishes schedules which allow adequate preparation, review, and follow-up time |
| | Reviews the QI Plan participants, materials and schedule with the author |
| | Ensures materials delivered to inspectors |
| During QI | Determines if the deliverable being inspected has been thoroughly reviewed by the participants and the following items taken in account: |
| | Project plan considerations |
| | Performance considerations |
| | System maintainability and standards |
| | Exception and limits processing |
| | Test preparation (plan or script) |
| | Others |
| | Determines if a reinspection is required |
| After QI | Ensures all Rework Items have been verified and/or reinspected |

Figure 7:
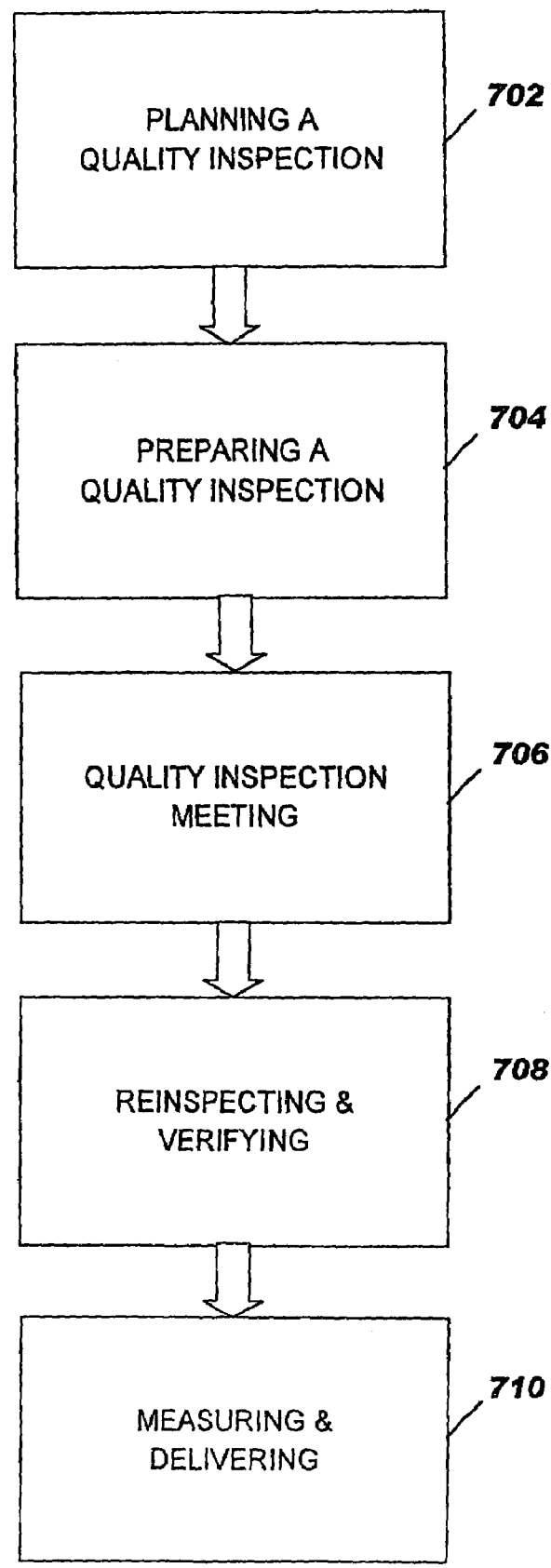
FIG. 7 is a flow chart of the Quality Inspections Process of the invention.

Detailed Description of the Quality Inspection Process:

In step 702 of FIG. 7, the quality inspection process begins by planning a quality inspection. Table 28 shows the actors, the inputs, and outputs associated with this task.

TABLE 28

| Step 702 | | | |
|---|---|---|---|
| TASKS | ACTORS | INPUTS | OUTPUTS |
| Discuss QI Plan | Team Leader, Author | — | QI Meeting Plan |

In step 704, the planned quality inspection is prepared following the tasks as shown in Table 29 below.

TABLE 29

Step 704

| TASKS | ACTORS | INPUTS | OUTPUTS |
| --- | --- | --- | --- |
| Open QI Records | Author | QI Meeting Plan | QI Records with status 'Opened' |
| Schedule Date, Time and Location for QI Meeting | Author | — | QI Meeting Report created |
| Distribute Material within Reviewers | Author | Inspection Material | — |
| If Deliveries must be pre-inspected, then Deliveries are distributed and preinspected | Author, Inspectors | Deliveries | Pre-inspected Deliveries |
| Update QI Records with Rework Items | Author, Inspectors | QI Records, Pre-inspected deliveries | QI Records + Rework Items |

The first task is to open a quality inspection record in the Quality Inspection Tracking Database 106, comprising several fields defining topics related to the specific inspection as illustrated in table 30 below:

TABLE 30

QI Record

| Fields | Description |
| --- | --- |
| Raising Date | DD/MM/YY |
| Quality Inspection Record Id | (Automatically generated) |
| Status | Opened/Closed |
| Priority | Low/Medium/High |
| Description | (Text) |
| Detailed Description | (Text) |
| Objectives | (List of objectives) |
| Author | (Name) |
| Inspectors | (List of Names) |
| Rework Items | (List of rework items) |
| Responsible for Approval | (Name) |
| Due Date | DD/MM/YY |
| Closing Date | DD/MM/YY |

If a topic requires further review or generates an action, this is called a Rework Item, and a corresponding record is stored in the QIT database 106. Every Inspection record is independent and stores all related information including history, status and pending rework items. Every Rework Item record is associated with one and only one Inspection Record, and has an Actioner who is responsible for the item.

Table 31 below shows an example of a Rework item assigned to an inspection record:

TABLE 31

Rework item

| Fields | Description |
| --- | --- |
| Quality Inspection Record | (Title) |
| Rework Item Status | Pending, Finished |
| Application | (Name of application) |
| Estimated Effort | (Days) |
| Rework Item Open Date | DD/MM/YY |
| Rework Item Target Date | DD/MM/YY |
| QIR Target Date | DD/MM/YY |
| Rework Item Owner | (Name) |

TABLE 31-continued

Rework item

| Fields | Description |
| --- | --- |
| Rework Item Subject | (Title) |
| Description | (Comments & Attachments) |
| Close Comment | (Comment) |

The first step further includes a QI meeting preparation covering the tasks of the last four rows of table 29.

In step 706 the meeting is held, as shown in Table 32 below:

TABLE 32

Step 706

| TASKS | ACTORS | INPUTS | OUTPUTS |
| --- | --- | --- | --- |
| If preparation and attendees are adequate, update QI Meeting Report | Moderator | QI Meeting Report | QI Meeting Report updated |
| Determine how to review documents | All | QI Records + Rework Items | — |
| Review Rework Items | Author, Inspectors | Rework Items | — |
| Assign Origin, Category and Severity to Rework Items | Moderator | Rework Items | Rework Items updated |
| Summary of Results | Recorder | QI Meeting Report | QI Meeting Report updated |
| Decide if reinspection is required | All | — | New QI Records, if required |
| If reinspection is not required, assign Rework Items to Inspectors | Moderator | Rework Items | Rework Items assigned |
| Complete QI Meeting Report | Recorder | QI Meeting Report + Rework Items | QI Meeting Report finished |

Once the meeting is completed, a reinspecting and verifying step 708 is processed. Step 708 follows the tasks as mentioned in Table 33 below:

TABLE 33

Step 708

| TASKS | ACTORS | INPUTS | OUTPUTS |
| --- | --- | --- | --- |
| Update QI Records with Rework Items | Author | QI Records + Rework Items | QI Records Updated |
| Solve Rework Items and update QI Records with results | Author | QI Records | QI Records Updated with results |
| Review results or Rework Items | Inspectors | QI Records + Rework Items | QI Records Updated with review check |
| Check all Inspectors have reviewed Rework Items | Team Leader | QI Records | — |

Finally, the QI process ends with a measuring and delivering step 710 which follows the tasks as mentioned in Table 34 below:

TABLE 34

Step 710

| TASKS | ACTORS | INPUTS | OUTPUTS |
|---|---|---|---|
| Close corresponding QI Records when all associated Rework Items are solved | Author + Team Leader | QI Records | QI Records with status = 'closed' |
| Include Closed QI Records in next QI Plan, if necessary | Author + Team Leader | — | QI Meeting Plan |

The QI's process is accessible thru a GUI interface which allows a user to open/up-date inspection records and rework item records in the different phases of the process. The inspection/rework item records are stored in the Quality Inspection Tracking Database 106, which also implements automatic procedures for communicating status changes to the interested parties, and for creating lists of opened/closed QI records for reporting and management purposes. The user interface not only shows the list of the Inspection Records, but also the list of associated Rework Items for every Record. Standard buttons in the navigation area provide different views of the Records (by number, action manager, priority or status). Preferably, there is also a view for the checklists that the action manager of the inspection completes for the deliverables or products to be inspected. The Inspection Records are opened during a Quality Inspection Meeting from a form available in the QM Database 110.

In the Olympics application, a Lotus Notes database implements the whole system. Several Lotus Notes scripts implement the logic required to support automatic workflows and notifications of the related process. The interface offers to the user the following views: Inspections by number, Inspections by Action Manager, Inspections by Priority, Inspection Checklists, Pre-Open Inspections, Open Documents, Inspected Documents, and Closed Documents. These views are particularly adapted to the specific example; for other applications, any variant of the views may be implemented.

Description of the QMT Process:

Referring again to FIG. 2, column 212 shows a Quality Metrics Tracking Process 'QMT' that is now described with reference to FIG. 8. The 'QMT' process tracks metrics for the Processes and/or the Code produced by the different projects.

Every time a Project Team produces a Measurement Report, the report is stored in QMD, and the QMO is notified. Then, QMO is responsible for analyzing the measurement report and raising Quality Management Actions, if necessary. In a similar way, QMO controls the scheduling of these reports. Any delay or inaccuracy regarding the Project Team Quality Plan is studied. On a regular basis, and preferably every month, an automatic procedure consolidates all countable and logging data in the Quality Management Database. This consolidated report is discussed in the Quality Management Meetings.

Definitions for the QMT Process:

Defect Tracking Database. This database includes all information regarding defects opened and closed, tracking the defects through the different possible status. Both testers and developers update the database with information regarding defects processing. This database is not one of the databases 100 of the Quality Management Framework.

Planning Metrics. Both QMO and the people (Executives, Team Leaders) interested in statistics define what information is required for decision support based on metrics. This is part of the Quality Plan of every team. QMO studies technical constraints and provides solution to support information needs.

Producing Process Metrics. As all processes regarding Quality Management are in a common platform and supported by the same tools, QMO tracks process performance and usage by applying metrics to the implemented workflows.

Producing Product Metrics (for traditional code). Based on information generated by the Defect Tracking process, QMO produces metrics used for supporting decision making and statistics about the Products quality. This information is used temporally, that is, keeping track of history in order to observe evolution in the performance of the teams, both development and test.

Producing Product Metrics (for Lotus Notes code). The technology used for producing metrics for Lotus Notes is different, because the technology used to produce the code is different. The parameters for calculating complexity are different, and so different tools are used. Otherwise, this step is the same as the step immediately above.

Analyzing Metrics. Once metrics are produced, experts analyze them and arrive at conclusions.

Producing Executive Summaries. The objective of the previous assesment is to publish results (at different levels, depending on receivers of information) and to generate Quality Actions for continous improvement. Summaries are produced by QMO regularly (time, releases) and actions are proposed by management.

Roles for QMT Process:

Project Test Team. A group of people in charge of testing the software components and the documentation. They update the Defect Tracking Database.

Project Team Leader. The person responsible for a Project or Sub-project within the Software Development Organization. He is responsible for the Quality Plan of his team, so he decides which metrics are required for detecting inefficiencies in the development process or inaccuracies in the code produced. He uses metrics to analyze performance and its temporal evolution.

Application Delivery Team: a group of people in charge of Configuration Management, which consists of collecting, compiling, packaging, and delivering software components. They keep control of versioning and ownership of these components.

Metrics Analyzer. An independent expert in Quality Metrics, who does not belong to any Project Team. His objective is to design the planned metrics and analyze all data produced afterwards.

Executive: A Member of the Board of Directors, who is interested in the results of the analysis.

Detailed Description of the QMT Process:

Metrics are needed in order to arrive at conclusions regarding Quality based on numeric criteria. Metrics are devised not only for code, but also for Processes. For code metrics, called here Product Metrics, two different technologies are considered: "traditional code" for code made using procedural or object oriented programming languages (such as the well-known C, C++, Java languages . . . ) and "Lotus Notes code", based on a 'Lotus Notes' database and template programming.

By this process, Project Teams provide information to QMO in order to build statistics and reports. These reports, which are periodically distributed to Team Leaders and the Executives, are used to monitor Quality achievements in the Organization. The problems detected become input to the Defect Prevention process and to the Quality Management Actions process, as will be described later.

The Quality Management Office in the Software Development Organization is responsible for collecting and analyzing the evolution of the project using Process and Product Metrics. These topics are reviewed based on information stored in a specific area of the Quality Management Database. Specific logic is provided to support automatic procedures for generating reports and communicating status to the interested parties.

The content of the database includes records for Process metrics, Product metrics, and Reports. Every record is independent, and contains in dedicated fields the relevant information including source and calculated data.

Tables 35 through 45 show the Process and Product Metrics, as well as Reports records, with their associated tasks.

TABLE 35

Application Measures Record for traditional code

| Fields | Description |
| --- | --- |
| Application | (Application Name) |
| Alias | (Application Nickname) |
| DB | (Name of test database where data comes from) |
| Team | Project A, Project B . . . |
| In Test | Yes, No |
| General - Status | Red, Yellow, Green |
| General - Reuse Index | (Percentage) |
| General - Technology | (Comment) |
| Product Difficulty - Complexity Index | 1 to 5 |
| Product Difficulty - Intrafaces | 1 to 5 |
| Product Difficulty - Interfaces | 1 to 5 |
| Product Difficulty - Timing & Serialization | 1 to 5 |
| Product Difficulty - Design | 1 to 5 |
| Product Difficulty - Existing Documentation | 1 to 5 |
| Product Difficulty - Scope | 1 to 5 |
| Code Metrics - Source Code - # of files | (Number) |
| Code Metrics - Source Code - Size of files | (Number) |
| Code Metrics - Source Code - Lines of Code | (Number) |
| Code Metrics - Source Code - # of statements | (Number) |
| Code Metrics - Object Code - # of files | (Number) |
| Code Metrics - Object Code - Size of files | (Number) |
| Code Metrics - Deliverables - # of files | (Number) |
| Code Metrics - Deliverables - Size of files | (Number) |
| Code Metrics - Deliverables - Lines of Code | (Number) |
| Code Metrics - Deliverables - # of statements | (Number) |
| Quality Inspections - # of Records | (Number) |

TABLE 35-continued

Application Measures Record for traditional code

| Fields | Description |
| --- | --- |
| Quality Inspections - # of Rework Items | (Number) |
| Quality Inspections - # of RI closed | (Number) |
| Quality Inspections - % of RI closed | (Percentage) |
| Estimated Cost | (Days) |
| Defect Tracking - Status | Red, Yellow, Green |
| Defect Tracking - Number of Defects | (Number) |
| Defect Tracking - Go to Defects | (Reference to Test Database View) |
| Defect Tracking - Defects by Severity | (List of numbers) |
| Defect Tracking - Defects by Phase | (List of numbers) |
| Defect Tracking - Test Efectiveness by Phase | (List of Percentages) |
| Defect Tracking - Start Date of Phase | DD/MM/YY |
| Defect Tracking - Finish Date of Phase | DD/MM/YY |
| Defect Tracking - % Completed by Phase | (List of Percentages) |
| Defect Tracking - Defect Density by Phase | (List of numbers) |
| Defect Tracking - Projection of Defects and Density by Phase | (List of numbers) |
| Defect Tracking - Defect Density for Severity 1 and 2 by Phase | (List of numbers) |
| Defect Tracking - Defects by State | (List of numbers) |
| Defect Tracking - Defects Age by Severity | (List of Days) |
| General Parameters - TC family | (Team Connection Family Name) |
| General Parameters - Based on | (Type of source of metrics) |
| General Parameters - TC Release | (Team Connection Release Name) |
| General Parameters - TC Workarea | (Team Connection Work area Name) |
| General Parameters - TC Driver | (Team Connection Driver Name) |
| General Parameters - TC Version | (Team Connection Version Name) |
| General Parameters - Source Code Metric | Yes, No |
| General Parameters - Object Code Metric | Yes, No |
| General Parameters - Deliverables Metric | Yes, No |
| General Parameters - Deliverables Code Metric | Yes, No |
| General Parameters - Programming Language | C++, Java . . . |
| General Parameters - Source files | (List of files extensions) |
| General Parameters - Object files | (List of files extensions) |
| General Parameters - Deliverables files | (List of files extensions) |
| Comments | (Comments about metrics calculation) |

TABLE 36

Application Measures Record for Lotus Notes code

| Fields | Description |
|---|---|
| Application | (Application Name) |
| Group | (Group of Application Name) |
| Team | Project A, Project B . . . |
| In Test | Yes, No |
| General - Status | Red, Yellow, Green |
| General - Reuse Index | (Percentage) |
| General - Technology | (Comment) |
| Product Difficulty - Complexity Index | 1 to 5 |
| Product Difficulty - Intrafaces | 1 to 5 |
| Product Difficulty - Interfaces | 1 to 5 |
| Product Difficulty - Timing & Serialization | 1 to 5 |
| Product Difficulty - Design | 1 to 5 |
| Product Difficulty - Existing Documentation | 1 to 5 |
| Product Difficulty - Scope | 1 to 5 |
| Code Metrics - Link | (Reference to Notes Development Database) |
| Code Metrics - Executable size | (Number) |
| Code Metrics - # of Actions | (Number) |
| Code Metrics - # of Agents | (Number) |
| Code Metrics - # of Fields | (Number) |
| Code Metrics - # of Forms | (Number) |
| Code Metrics - # of subforms | (Number) |
| Code Metrics - # of Columns | (Number) |
| Code Metrics - # of Views | (Number) |
| Code Metrics - # of Scripts | (Number) |
| Code Metrics - Deliverables - Number of files | (Number) |
| Code Metrics - Size of files | (Number) |
| Quality Inspections - # of Records | (Number) |
| Quality Inspections - # of Rework Items | (Number) |
| Quality Inspections - # of RI closed | (Number) |
| Quality Inspections - % of RI closed | (Percentage) |
| Estimated Cost | (Days) |
| Defect Tracking - Status | Red, Yellow, Green |
| Defect Tracking - Number of Defects | (Number) |
| Defect Tracking - Go to Defects | (Reference to Test Database View) |
| Defect Tracking - Defects by Severity | (List of numbers) |
| Defect Tracking - Defects by Phase | (List of numbers) |
| Defect Tracking - Test Effectiveness by Phase | (List of Percentages) |
| Defect Tracking - Start Date of Phase | DD/MM/YY |
| Defect Tracking - Finish Date of Phase | DD/MM/YY |
| Defect Tracking - % Completed by Phase | (List of Percentages) |
| Defect Tracking - Defect Density by Phase | (List of numbers) |
| Defect Tracking - Projection of Defects and Density by Phase | (List of numbers) |
| Defect Tracking - Defect Density for Severity 1 and 2 by Phase | (List of numbers) |
| Defect Tracking - Defects by State | (List of numbers) |
| Defect Tracking - Defects Age by Severity | (List of Days) |
| Comments | (Comments about metrics calculation) |

TABLE 37

Other Quality Measures Record

| Fields | Description |
|---|---|
| Date | DD/MM/YY |
| Subject | (Title) |
| Project Teams Affected | Project A, Project B . . . |
| Author/s | (List of Names) |
| Description | (Comment) |
| Attachments | (Files) |

TABLE 38

Quality Status Report Record

| Fields | Description |
|---|---|
| Date | DD/MM/YY |
| Subject | (Title) |
| Project Teams Affected | Project A, Project B . . . |
| Author/s | (List of Names) |
| Description | (Comment) |
| Attachments | (Files) |

TABLE 39

Quality Management Measures Record

| Fields | Description |
|---|---|
| Risk Report: # Open, # Closed, # Total | (List of numbers and percentages) |
| Risk Report: # Solved, # Under Control, # Not Critical by Now, # Open | (List of numbers) |
| Issues Report: # Open, # Closed, # Total | (List of numbers and percentages) |
| Issues Report: # Solved, # Under Control, # Not Critical by Now, # Open | (List of numbers) |
| Changes Report: # Open, # Closed, # Total | (List of numbers and percentages) |
| Changes Report: # Accepted, # Deferred, # Rejected, # Withdrawn | (List of numbers and percentages) |
| Changes Report: Estimated Effort | (Days) |
| QM Activity: # of documents in QMD | (Number) |
| QM Activity: # of documents in QITS | (Number) |
| QM Activity: # of documents in QMATS | (Number) |
| QMD Access: # of DB accesses, # of DB writes, # of DB reads | (List of Numbers) |
| QITS Access: # of DB accesses, # of DB writes, # of DB reads | (List of Numbers) |
| QMATS Access: # of DB accesses, # of DB writes, # of DB reads | (List of Numbers) |
| # of Meetings by Type | (List of Numbers and percentages) |
| # of Quality Documents by Project Team | (List of Numbers and percentages) |
| # of Quality Actions by Status | (List of Numbers and percentages) |
| # of Quality Actions by Project Team | (List of Numbers and percentages) |
| # of Quality Actions by Category | (List of Numbers and percentages) |
| # of Tasks (Total, Pending, Done) | (List of Numbers) |
| Mean number of Tasks per Action | (Number) |

TABLE 39-continued

Quality Management Measures Record

| Fields | Description |
|---|---|
| Estimated Effort of all Tasks | (Days) |
| Estimated Benefit of all Tasks | (Days) |
| # of Inspection Meetings by Project Team | (List of Numbers and Percentages) |
| # of Inspection Meetings with Associated Inspection Records by status | (List of Numbers and Percentages) |
| # of Inspection Records by Status | (List of Numbers and Percentages) |
| # of Rework Items by Status | (List of Numbers) |
| Mean number of Rework Items by Quality Inspection | (Number) |
| # of Inspection Records per Application | (List of Numbers) |
| # of Rework Items per Application | (List of Numbers) |
| # of Closed Rework Items per Application | (List of Numbers) |
| % of Closed Rework Items per Application | (List of Percentages) |
| Estimated Cost of Rework Items per Application | (Days) |
| # of Documents per workflow and status | (List of Numbers) |
| % of Documents per workflow and status | (List of Percentages) |
| Total # of Documents per workflow | (List of Numbers) |
| Total # of Documents per status | (List of Numbers) |
| # of Documents by Project Team | (List of Numbers) |
| % of Documents by Project Team | (List of Percentages) |
| # of Documents by Type | (List of Numbers) |
| % of Documents by Type | (List of Percentages) |
| # of Revision Records | (Number) |
| # of Comments by Document | (List of Numbers) |
| Total number of comments to documents | (Number) |

Figure 8:
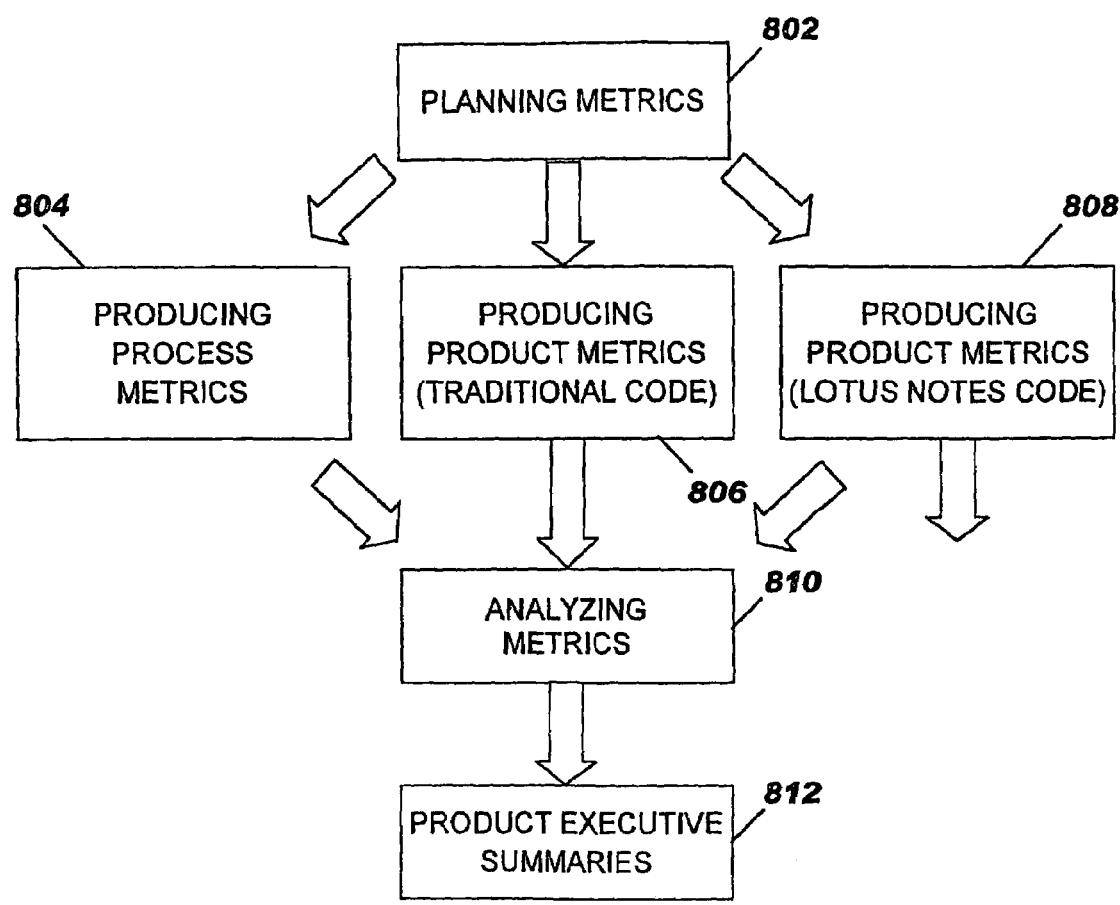
FIG. 8 is a flow chart of the Metrics Process of the invention.

As shown in FIG. 8, the QMT process begins at step 802 with the task of planning the Metrics to be produced and analyzed. This operation is preferably done during the preparation of the Project Teams Quality Plans.

Step 802 is divided into several tasks as shown in Table 40, which indicates the tasks in the first left hand column. The second column indicates the actors that perform the corresponding tasks. The third column indicates the inputs used for performing the corresponding tasks, and the fourth column indicates the outputs resulting from the tasks:

TABLE 40

Step 802

| TASKS | ACTORS | INPUTS | OUTPUTS |
|---|---|---|---|
| Build Metrics Planning section in Team Quality Plan | Project Team Leader | — | Project Quality Plan |
| Certification of Quality Plan | QMO | Project Quality Plan | Certified Quality Plan |
| Discuss objectives of metrics | Project Team Leader, Executive, QMO | Project Quality Plan | Metrics goals workproduct |
| Produce Metrics Requirements | Project Team Leader, QMO | Metrics goals, Project Quality Plan | Metrics Specification |
| Implement Metrics | QMO, Project Test Team, Application Delivery Team | Metrics | Metrics Infrastructure implemented in QMF |
| Infrastructure |  | Specification |  |
| Write Metrics Manual | QMO | Metrics Specification, Metrics infrastructure | Metrics Manual |
| Education to the team | QMO, Project Team Leader | Metrics Manual | Metrics deployed |

The first task is to build the Metrics Planning in the Team Quality Plan. Each Project Team defines the data to be measured regarding the respective process, code size, defects and so on. Next, the QMO certifies the Quality Plan, including the Metrics. The process of Quality Plan certification is intended to establish a standard and a common view of the objectives of Quality Management among all the teams.

The Executives in the Software Development Organization then review the Quality Plans, and propose for each project, the parameters to be controlled. This results in a document with the final objectives of producing Metrics in that team. Then, with this metrics goals, the project team leader writes a document of requirements, which is the entry point for the next task.

This task consists of implementing the infrastructure needed to collect the Metrics defined in the requirements. In order to help teams collect the Metrics, two final tasks are required: to write a user's manual (which should include all previous information: summary of Quality Plan, Metrics goals, specification and build of infrastructure) and to educate the team. Once the team has received all the information, and the infrastructure is tested in a production environment, the process goes to step 804.

In step 804, Process Metrics are produced as planned while the Project is going on. Again, this step is preferably divided into tasks with appropriate actors/inputs and outputs as shown on the following table:

TABLE 41

Step 804

| TASKS | ACTORS | INPUTS | OUTPUTS |
|---|---|---|---|
| Collect Process Information from QMF | QMO | QMF | Process Data |
| Produce Process Statistics | QMO | Process Data | Process Statistics in QMF |

The first task is to collect process information from the QMF system. This is automatically done by QMF using internal infrastructure. As all processes that require control in the Organization are automated using the QMF tools, all information (such as number and type of items of each process, documents generated and so on) regarding these processes is available in the system.

The next task is to produce statistics. On a regular basis, QMO uses a QMF consolidation tool which collects current statistical information in the database, computes statistics, and stores the statistics as records which can be retrieved any time by date. Alternatively, this process can be triggered automatically.

In step 806, Product Metrics (both for traditional code and Lotus Notes code) are produced as planned while the Project is going on. Again, this step is preferably divided into tasks with appropriate actors/inputs and outputs as shown in the following table:

TABLE 42

Step 806

| TASKS | ACTORS | INPUTS | OUTPUTS |
|---|---|---|---|
| Collect Product Information | Application Delivery Office | Code | Product Data |
| Include Product Information in QMF in proper format | QMO | Product Data | Product Data in QMF |
| Collect Defect Information | Project Test Team | Defects | Defect Data |
| Include Defect Information in QMF in proper format | QMO | Defect Data | Defect Data in QMF |
| Produce Product Statistics | QMO | Product Data, Defect Data | Product Statistics in QMF |

The first task is to produce basic information regarding the code. Next, QMO takes the Product data and converts it into a proper format to be included in QMF, as defined in the Metrics specifications from the previous step 804. Then, similar to the way in which the Application Delivery team collects information regarding the code, the Test team collects basic information regarding defects. Categorization of defects based on deliverables must be consistent with the categorization of product data by application. This is required in order to produce useful statistics. The Next task is, again, to include the information provided by the Test team in a proper format into QMF. This is done by QMO. The last task is to produce the statistics according to the Metrics requirements defined in the first step 802.

In next step 808, Process and Product Metrics Reports are produced as planned on a regular basis. Again, this step is preferably divided into tasks with appropriate actors/inputs and outputs as shown on the following table:

TABLE 43

Step 808

| TASKS | ACTORS | INPUTS | OUTPUTS |
|---|---|---|---|
| Publish Process Metrics | QMO | Process Metrics | Process Metrics Report in QMF |
| Publish Product Metrics for traditional code | QMO | Product Statistics in QMF | Product Metrics Report in QMF |
| Publish Product Metrics for Lotus Notes code | QMO | Product Statistics in QMF | Product Metrics Report in QMF |

The first task is to publish Process Metrics. Using statistics stored in QMF, QMO represents the data in a summarized, comprehensive way, using charts and aggregating data in a form that is ready to be inspected and analyzed by experts. Graphics and aggregated statistics produced in this step are generated both automatically and manually by QMO. Next, QMO does the same with statistics regarding the code. This must be done as many times as different technologies or significant groups of applications with different Metrics objectives are defined. In the example, two different tasks, one for traditional code (such as procedural or object-oriented programming languages like C, C++) and one for Lotus Notes programming are distinguished. However, any implementation of a QMF system may include its own approach.

In step 810, Process and Product Metrics are analyzed, generating conclusions based on experience and expert knowledge. Again, this step is preferably divided into tasks with appropriate actors/inputs and outputs as shown in the following table:

TABLE 44

Step 810

| TASKS | ACTORS | INPUTS | OUTPUTS |
|---|---|---|---|
| Generate Conclusions on Process Metrics | QMO, Metrics Analyser | Process Metrics Report in QMF | Quality Assessment on Processes |
| Generate Conclusions on Product Metrics | QMO, Metrics Analyser, Project Team Leaders | Product Metrics Report in QMF | Quality Assessment on Product |

The first task is to generate a conclusions report regarding the Process Metrics published in the previous step. Although this task is lead by the QMO, it is very likely dependent upon expert opinion and consultancy. The second task is to generate a conclusions report regarding Product Metrics.

The last step of FIG. 10 is a closing step 812, which includes the tasks of producing Executive Summaries and generating Quality Actions for continuous improvement of Processes of both Project Management and Development, as shown in the next table:

TABLE 45

Step 812

| TASKS | ACTORS | INPUTS | OUTPUTS |
|---|---|---|---|
| Publish Quality Assessments for Test Team | QMO, Test Team | Quality Assessment on Processes and on Products | Quality Assessment Report for Test Team |
| Publish Quality Assessments for Project Team Leaders | QMO, Project Team Leaders | Quality Assessment on Processes and on Products | Quality Assessment Report for Project Team Leaders |
| Publish Quality Assessments for Executives | QMO, Executives | Quality Assessment on Processes and on Products | Quality Assessment Report for Executives |
| Generate Quality Actions regarding Processes | QMO, Executive | Quality Assessment Report for Executives | Quality Actions based on Process Metrics in QMF |
| Generate Quality Actions regarding Product | QMO, Test Team, Project Team Leaders, Executives | All Quality Assessment Reports | Quality Actions based on Product Metrics in QMF |

The first task is to publish a Quality Assessment for the Test Team, considering the information that might be useful to them (defined in the first step of the process). The second and third tasks are to publish similar Quality Assessment reports for the Project Team Leaders and the Executives. These Assessment Reports, signed by QMO and the Quality experts who generated the conclusions in previous step 810, are used as entry data for the two last tasks, which consist of generating Quality Actions for continuous improvement. Quality Actions, may be generated by the responsible persons of each team simply by looking at the conclusions, or in further Defect Prevention or on-purpose Quality Management meetings.

The QMT process is accessible through a user friendly interface, such as the Lotus Notes Graphical User Interface (GUI) from Lotus Corporation, and offers to the user several views accessible through standard buttons in the navigation area: Quality Measurements views of Project Plans, Product Development Metrics, Defect Tracking Metrics, Process Metrics, Product Metrics by Application and Group of Applications, or Other Metrics, as well as special Reports views of Metrics, Historical data by date, and Quality Management data.

In each view, the main parameters of every record are available with brief descriptions. When a new Metric or Report is created, the record includes all the relevant data. The status of the data automatically changes, helping the user to follow the workflow defined by the Quality Metrics System Tracking Process.

Description of the Defect Prevention Process:

Each of the quality processes 201 to 212 generates respective quality reports as indicated by block 214 of FIG. 2.

The quality reports are analyzed by Project Teams in order to identify potential problems (block 216) associated with the quality reports' conclusions or results. The problems may be related to the products, such as code defects or the problems may be organizational issues or troubles. When a problem is detected, a Defect Prevention process (block 218), which is a continuous improvement process, starts.

The Defect Prevention Process 'DPP' is intended to be a method for studying data in order to improve Quality. An advantage of the invention is the integration of such a process into the complete Quality Management Framework.

The Defect Prevention Process may be conducted periodically to track Quality in the Project Teams, or specifically on-demand to solve a particular problem.

Definitions for the Defect Prevention Process:

DPP Process Step Kick-Off or Review Meeting: In this meeting, the Team Leader wanting to establish a DPP process in his organization explains how DPP works and its objectives, and gets team involvement to identify some generic defects and causes which need to be tracked. Metrics or areas of focus are identified for further Causal Analysis Meetings. If DPP kickoff has already been conducted, a Review of all the Actions identified in previous meetings should be done.

DPP Kick-Off Package: The kick-off package contains the materials that the team leader believes are useful to help the team prevent defects and get the job done more efficiently. It preferably contains three sections: a Process section (descriptions of methods, tools, guidelines, checklists, inputs, and outputs), a Quality section (description of DPP and its practice, inspection checklists, common error lists, error prone modules) and a Contacts section (cooperation or dependencies on other teams and contacts to these teams).

DPP Causal Analysis Meeting: Focusing on concrete problems identified (previously or during the meeting), the team tries to identify causes or commonalities for them. The discussion should be open to all the team members, not just the managers.

Problem: A Problem, in terms of DPP, is not only a code defect, but may be anything that teams identify as contributing to inefficiencies or further errors in the processes or workproducts (defects, issues, or troubles).

Cause Category: During Kick-off or Causal Analysis meetings, typical Cause Categories are identified, for example: communications, oversight, education, transcription or process.

Probing Questions & Answers: Sometimes, it is not easy to identify in which category a problem fits. For this reason, probing questions may be prepared for each category. Typical examples are:

For communication: what was not communicated, from whom, to whom?

For oversight: what was not considered thoroughly?

For education: what was not understood?

For transcription: what procedure was being used?

For process: what aspect of the process encouraged the defect?

Quality Management Action (QMA): Any initiative for improving Quality of the Products or Processes managed within the Software Development Organization. The QMA are stored in the Quality Management Action database 108.

Generic Analysis: In addition to problem analysis itself, DPP Causal Analysis Meetings should include generic analysis of the everyday work of the team. This is articulated through "Trends and Commonalities", "What went right" and "What went wrong" comments.

"Trends and Commonalities": Common types of problems, a trend in a cause category, the cause itself of the process step created (education problems, oversight in the design phase) and common types of suggested actions (tools, documentation).

"What went right": Things that have enhanced the productivity or effectiveness of the team (tools), new practices that prevent defects (better communications), aspects that are considerably better than in previous steps.

"What went wrong": Things that have reduced the productivity of the team, caused or created problems, or which are considerably worse than in previous steps.

Preparing a DPP Kick-Off or Review Meeting: The first step of DPP. The DPP Initiator defines the objectives of DPP, selects important information, selects people to attend the meetings, and sets up the meeting agenda.

Conducting a DPP Kick-Off or Review Meeting: In a Kick-off meeting, the Initiator explains what DPP is, promotes Attendees participation, and collects information to open Quality Actions or to prepare future Causal Analysis Meetings. In a Review Meeting, in addition, previously opened Quality Actions related to DPP are tracked and evaluated.

Preparing a DPP Causal Analysis Meeting: All the activities required to prepare the Causal Analysis Meeting: writing an agenda, selecting Attendees, setting up the meeting, distributing material, etc.

Conducting a DPP Causal Analysis Meeting: Formal process of opening, conducting, and closing the meeting, trying to get useful information from all participants. The result is a list of Quality Actions to improve the operation of the Team performing the review.

Tracking Quality Management Actions: Follow-on of the agreed actions, promoting performance in the execution and closing of them, as well as evaluating the impact of their accomplishment in terms of reducing causes of problems.

Roles for the Defect Prevention Process:

Initiator: a person who plans the DPP meeting, setting up its expectations and agenda, and selecting Attendees. Typically this is a Project Team Leader.

Moderator: a person who leads the meeting, keeping in mind the objectives, helping the Attendees to work as a team, and promoting participation of all Attendees suitable to contributing to the results in a significant way.

Recorder: a person responsible for capturing and recording all minutes and conclusions of the meeting in the QMD. He opens Quality Actions, including cross references for easier tracking afterwards.

Attendee: a person who actively attends the DPP meeting and contributes to the results with opinions, conclusions, or decisions, or by performing follow-on actions.

Observer: A person who attends the DPP meeting but does not participate actively, and has no defined role.

Figure 9:
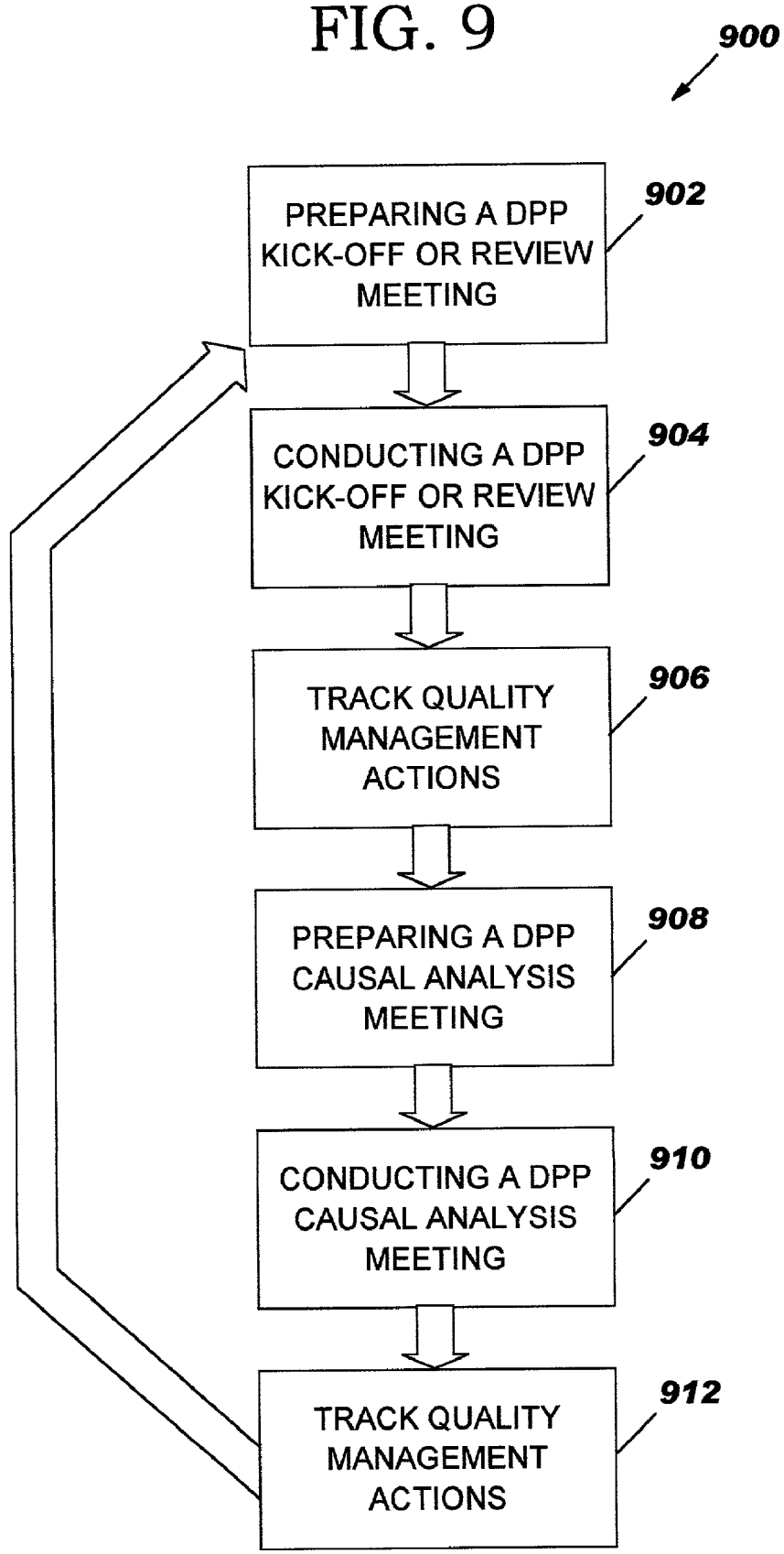
FIG. 9 is a flow chart of the Defect Prevention Process of the invention.

Detailed description of the Defect Prevention Process:

FIG. 9 shows a DPP flowchart.

An Initiator calls a 'DPP' meeting after collecting information and selecting hypotheses to check. Interested parties then meet to analyze the hypotheses and offer their opinions and wisdom. However, the meeting Moderator is responsible for focusing the discussion on the critical points. A systematic approach is required. The tools integrated in the Quality Management Framework of the present invention allow the DPP meeting Attendees to categorize problems and thereby to develop common actions to minimize these problems within categories. The actions are tracked using the Quality Management Actions Process described later. The DPP collects information structured as Defect Abstract, Cause Category, Probing Questions and Answers, and Quality Actions based on Defect Analysis. The systematic approach of the invention allows grouping defects into categories and generating generic solution to the main problems, as the problems may now be ranked.

Step 902 prepares Kick-Off or Review Meetings. Table 46 below lists the different tasks of this first step:

TABLE 46

Step 902

| TASKS | ACTORS | INPUTS | OUTPUTS |
|---|---|---|---|
| Identify subjects for DPP Process and search for material | Initiator | — | Material for DPP |
| Schedule Date, Time and Location for a DPP Kick-Off Meeting and select Attendees and Observers | DPP Initiator | Material for DPP | DPP Kick-off Meeting Report created in QMD |
| Distribute Material within Attendees and Observers | Initiator | Material for DPP | — |

Once prepared, the meeting is conducted in step 904. Table 47 below lists the different tasks of the conducting step:

TABLE 47

Step 904

| TASKS | ACTORS | INPUTS | OUTPUTS |
|---|---|---|---|
| DPP Introductory Education | Initiator | DPP Educational Material | — |
| Review internal processes and defects | Moderator, Attendees | — | DPP Kick-off Meeting Report updated |
| Open QMAs based on previous review | QMO | — | QMAs opened, DPP Kick-off Meeting Report updated |
| Review Previously opened QMA and evaluate results | Attendees, Recorder | DPP QMAs | DPP Kick-off Meeting Report updated |
| Agree on follow-on actions and close meeting | Initiator, Moderator, Attendees | — | DPP Kick-off Meeting Report finished |

Step 906 tracks Quality Actions opened in step 904. The tasks are described in detail later with reference to FIG. 10.

In step 908, a DPP causal analysis meeting is held. Table 48 below summarizes the tasks.

TABLE 48

Step 908

| TASKS | ACTORS | INPUTS | OUTPUTS |
|---|---|---|---|
| Identify subjects for DPP Causal Analysis and search for material | Initiator | — | Material for DPP |
| Schedule Date, Time and Location for a DPP Causal Analysis Meeting and select Attendees and Observers | Initiator | Material for DPP | DPP Causal Analysis Meeting Report created in QMD |
| Distribute Material within Attendees and Observers | Initiator | Material for DPP | — |

Again, once prepared, the causal analysis meeting is conducted in step 910 as described in Table 49 below:

TABLE 49

Step 910

| TASKS | ACTORS | INPUTS | OUTPUTS |
|---|---|---|---|
| Introduce topics, objectives and material for current Causal Analysis | Initiator | Material for DPP | DPP Causal Analysis Meeting Report updated |
| Perform Defect Analysis discussion | Initiator, Moderator, Attendees | Material for DPP | DPP Causal Analysis Meeting Report updated |
| Review internal processes and defects | Moderator, Attendees | — | DPP Causal Analysis Meeting Report updated |
| Open QMAs based on previous reviews | QMO | — | QMAs opened, DPP Causal Analysis Meeting Report updated |
| Perform Generic Analysis | Moderator, Attendees | — | DPP Causal Analysis Meeting Report updated |
| Agree on follow-on actions and close meeting | Initiator, Moderator, Attendees | — | DPP Kick-off Meeting Report finished |

Finally, tracking of Quality Management Actions is performed in step 912, as described below with reference to FIG. 10. The process loops back to step 902 when appropriate.

The Defect Prevention Process is accessible to users through a GUI interface, such as the Lotus Notes interface. The tasks of the process are conveyed by specific forms to be completed using standard navigation buttons.

Description of the Quality Management Action Tracking Process:

Block 220 of FIG. 2, which represents the Quality management action tracking process 'QMAT', is now described with reference to FIG. 10. Preferably this process is responsible for the Quality Management Office 'QMO', and consists of tracking Quality Management Actions. A Quality Management Action may be opened as a proposal by:

- An External Process Evolution Review. During a Board of Directors Meeting, the person responsible for tracking the meeting may define a Quality Management Action to be performed, after general consensus.
- A Project Status Meeting. In a similar way, during a Project Status Meeting, the person responsible for recording the meeting may define a Quality Management Action to be performed, after general consensus.
- Quality Management Office. Based on Quality Management Action Proposals stored in the Quality Management Actions Database, QMO can upload these proposals to formal Actions.
- Any person in the Organization who detects an issue which affects Quality should initiate a Quality Management Action to make QMO aware.

Quality Management Actions performance is reviewed during the Project Status Meetings. The information required for this Action follows the proper form.

The 'QMAT' process may be implemented in the Quality Management Actions Database 108. The objective is to improve internal processes and minimize risks by prevention and proaction.

Anyone in the Software Development Organization Project Team may be a QMA provider. Proposals are studied by the 'QMO' and, as necessary, are formally opened by assigning an Actioner, a Due Date, and a Priority. The Actioner and the other Notified people are together responsible for finding and implementing the corresponding Actions in order to solve the problem. Once the Actions have been finished and committed, the 'QMO' closes the incident. QMAs are tracked in the same Project Status Meetings as the Issues/Risks/Changes.

Definitions for the Quality Management Actions Process:

- Quality Management Action (QMA): Any initiative for improving Quality in the Products or Processes managed within the Software Development Organization. The QMA are stored in the Quality Management Action database 108. Tracking is the QMO's responsibility.
- To Raise a Quality Management Action: To create a QMA in the Quality Management Action database 108 with the status of "Proposal".
- To Open a Quality Management Action: After proper study of the Proposal, the Action changes to the status of "Opened" by assigning an Actioner, a Priority, and a Due Date.
- To Commit a Quality Management Action: To consider the Action finished by the Actioner. The status of the Action changes to "Commited".
- To Close a Quality Management Action: the 'QMO' reviews the answer given by the Actioner and definitively closes or re-opens the Action.

Roles for the Quality Management Actions Process:

- SDO member: Any person working for the Software Development Organization.
- Executive: A member of the Board of Directors.
- Project Status Group: Attendees to the Project Status Meetings. Typically, these are Project Team Leaders and the Software Development Organization Managers.
- Quality Management Office: An Organization within the Software Development Organization responsible for Quality Management.
- QMA Actioner: A person responsible for implementing or controlling the implementation of the necessary tasks to commit the QMA.
- QMA Notified: A person related to the action, who is not responsible for the final result, but who may be critical to the solution proposed or implementated.

Detailed Description of the Quality Management Actions Process:

In FIG. 10, step 1010, a Quality Management Action is raised and a QMA record is created as described in the following table 50:

TABLE 50

| Step 1010 | | | |
|---|---|---|---|
| TASKS | ACTORS | INPUTS | OUTPUTS |
| Create a QMA record in QMAT | SDO Member | N/A | A QMA with status "Proposal" |
| Fill Date and QMA id in the QMA record | Automatic | Date | QMA Proposal |
| Communicate to QMO new record created | Automatic | QMA Proposal | List of QMA Proposals |

Table 51 below shows an exemplary QMA record:

TABLE 51

| QMA Record | |
|---|---|
| Fields | Description |
| Raising Date | DD/MM/YY |
| Quality Management Action Id | (Automatically generated) |
| Status | Proposal/Opened/Committed/Closed |
| Priority | Low/Medium/High |
| Description | (Text) |
| Detailed Description | (Text) |
| Objectives | (List of objectives) |
| Responsible for Action | (Name) |
| Actions performed | (List of actions) |
| Responsible for Approval | (Name) |
| Due Date | DD/MM/YY |
| Closing Date | DD/MM/YY |

After the creation of the QMA record, the process goes to step 1012, wherein a QMA is opened either by the QMO or by a Project Status Group or an Executive.

Tables 52 and 53 below illustrate the tasks relative to each alternative of step 1012:

TABLE 52

Step 1012 for QMO

| TASKS | ACTORS | INPUTS | OUTPUTS |
|---|---|---|---|
| Review List of QMA Proposals | QMO | List of QMA Proposals | List of QMA Proposals to be Opened and Closed |
| Assign Actioner, Notified People, Priority and Due Date for QMA Proposals to be Opened | QMO | List of QMA Proposals to be Opened | QMA Opened |
| Close QMA Proposals for QMA Proposals not to be Opened | QMO | List of QMA Proposals to be Closed | QMA Closed |
| Communicate Actioners and Notified People of the QMA Opened | Automatic | List of QMA Opened | — |

TABLE 53

Step 1012 for Status Group or Board of directors

| TASKS | ACTORS | INPUTS | OUTPUTS |
|---|---|---|---|
| Create a QMA record in QMAT | Executives/Project Status G. | | A QMA with status "Proposal" |
| Assign Actioner, Notified People, Priority and Due Date for QMA Proposal to be Opened | Executives/Project Status G. | QMA "Proposal" | QMA Opened |
| Communicate Actioner and Notified People of the QMA Opened | Automatic | QMA Opened | — |

In step 1014, a committment on Quality Management Actions is performed through several tasks as summarized in table 54 below:

TABLE 54

Step 1014

| TASKS | ACTORS | INPUTS | OUTPUTS |
|---|---|---|---|
| Design necessary actions to achieve objectives of the assigned QMA | Actioner | QMA Opened | QMA Opened + List of Actions |
| Implement necessary actions to achieve objectives of the assigned QMA | Actioner + Notified People | QMA Opened + List of Actions | — |
| Describe list of actions performed and commit the QMA | Actioner | QMA Opened + List of Actions | QMA Commited |
| Communicate QMO | Automatic | QMA Committed | — |

Table 55 below shows an example of a task associated with a Quality Management Action Record:

TABLE 55

Associated Task

| Fields | Description |
|---|---|
| Team | Project A, Project B . . . |
| Quality Action Document | (Title) |
| Task Status | Pending, Finished |
| Estimated Effort | (Days) |
| Estimated Benefit | (Days) |
| Task Open Date | DD/MM/YY |
| Task Target Date | DD/MM/YY |
| Action Target Date | DD/MM/YY |
| Task Owner | (Name) |
| Task Subject | (Title) |
| Description | (Comments & Attachments) |
| Close Comment | (Comment) |

Step 1016 closes the Quality Management Actions by performing the following tasks:

TABLE 56

Step 1016

| TASKS | ACTORS | INPUTS | OUTPUTS |
|---|---|---|---|
| Review Actions performed and check objectives achieved | QMO | QMA Committed | QMA Closed |
| Communicate Actioner and Opener that QMA has been closed | Automatic | QMA Closed | — |

As for all the previously described processes, the QMA tasks are accessible through a GUI interface, such as a Lotus Notes interface. The records and associated tasks are stored in the QMAT database 108. Every QMA record is independent (although it can be linked from a Meeting Report) and stores all related information including history, status, and pending tasks. Every Task record is associated with one and only one QMA, and has an Actioner who is responsible for completing it.

The views offered to the user show not only the list of the Actions, but also the list of associated Tasks for every Action. Standard buttons in the navigation area provide different views of the Actions (by project, number, action manager, priority or status, for example). When the action "New Quality Action" is required, a blank form is displayed on the user terminal to be completed as a Proposal. Then, depending on the status, different buttons help the user to follow the Quality Actions Process. The Quality Action document also has links to the associated Tasks, which are included automatically by pressing the corresponding button when the Action is opened.

Once again, the system of the present invention has been described for a specific application of an Olympic Games Project. Many variants as to the choice of the quality processes may be applied according the Development Project without departing from the spirit and scope of the invention. Particularly, a Quality Perception Survey Process and corresponding tools may be part of the Quality Processes to generate Quality Actions to improve the Quality Plan.

The invention claimed is:

1. A computer implemented method for operating a quality plan in a product development organization comprising a plurality of members and having quality objectives for product development projects, the method analyzing a quality metrics report, and comprising the steps of:

defining a set of quality processes adapted to quality objectives required by an organization, wherein the set of quality processes includes:

a tracking process for identifying an issue in the product development projects, the tracking process being an internal project management tracking process that reports a status of current risks according to a priority of a risk issue and a target date for resolution of the risk issue;

a meeting set-up and reporting process for preparing and conducting meetings among a plurality of members of the organization;

a daily headlights reporting process for providing communications among members of the organization, wherein the daily headlights reporting process includes a headlight report being generated by a team leader, the headlight report including achievements of a day, changes to a project plan, assistance needed for a project, and potential catastrophes associated with the project, and wherein a quality management office consolidates the headlight reports daily into a single executive report, and wherein issue records are created daily from the consolidated headlight reports to initiate corrective actions to the project, and wherein the executive reports are consolidated weekly into a summary report;

a documentation process for reviewing and accepting documents generated by the product development projects;

an inspection process for determining deliverables generated by the product development projects to be reworked; and a metrics process for producing metrics for the data relative to the product development projects;

defining a set of computer implemented quality tools to collect data relative to product development projects, said quality tools comprising at least one database to store said collected data;

for each quality process, aggregating a set of the stored data to generate a respective quality report;

analyzing each quality report to detect problems in the product development projects; and using results of the analyzing step to initiate actions to resolve the problems detected, thereby improving quality of the product development projects, and wherein the daily headlights reporting process further comprises the steps of:

generating headlight reports having headlights data;

consolidating at a first predetermined frequency the headlights reports into a single executive report to be distributed to an executive distribution list;

recording issue items in an issue memory area based on data of the executive report; and generating at a second predetermined frequency a headlight summary based on the executive reports.

2. The method of claim 1, further comprising a survey process to evaluate a contribution of a member of the organization to a quality plan, wherein the evaluation of the contribution of the member is based on a difficulty of a software project, and wherein the difficulty of the software project is based on a software timing, whether pre-existing documentation exists for the project, a scope of use of software being developed by the software project, a complexity of the software, and a number of interfaces being used by the software.

3. The method of claim 1, wherein the tracking process further comprises the steps of:

recording the identified issue within an issue storing area of the at least one database;

assigning to the issue priority, a resolution target date, and an organization member responsible; and communicating to members of the organization actions taken to resolve the issue item.

4. The method of claim 3, wherein the recorded issue comprises a field for indicating an open date, an issue identifier, a description of the issue, and an open status.

5. The method of claim 4, further comprising the step of updating the open status field to a close status for a resolved issue in the at least one database.

6. The method of claim 1, wherein the meeting set-up and reporting process further comprises the steps of:

creating a meeting record in a meeting storing area of the at least one database, the meeting record comprising a meeting date, a meeting place, a meeting attendee, and a meeting agenda;

sending an invitation to the meeting attendee; and sending a meeting report after completion of the meeting to receivers.

7. The method of claim 6, further comprising the step of storing the meeting report in a reports storing area of the at least one database.

8. The method of claim 1, further comprising the steps of storing the executive report and the headlight summary in a reports memory area of the at least one database.

9. The method of claim 1, wherein the documentation process further comprises the steps of:

classifying a document and assigning a document review workflow to the document according to whether an originator of the document is a member of the organization; and creating a document record in a document memory area of the at least one database.

10. The method of claim 9, wherein the document is a technical document associated with a software product.

11. The method of claim 1, wherein the inspection process further comprises the step of:

creating an inspection record in an inspection memory area of the at least one database, the inspection record comprising an open date, an inspection record identifier, a priority, a description of a deliverable, and a target date to complete the inspection process.

12. The method of claim 1, wherein the metrics process further comprises the step of:

recording the quality metrics report in a metrics memory area of the at least one database.

13. The method of claim 1, wherein the metrics further comprise product metrics.

14. The method of claim 1, wherein the using results step further comprises the step of creating at least one quality action record in a quality actions memory area of the at least one database, the at least one quality action record comprising;

an open date, a quality action identifier, a priority, a description of a quality, action, and a target date to operate the quality action.

15. The method of claim 1, further comprising:
determining a cause of a defect in a software being created by the product development organization, wherein the determining step is performed by determining if one or more events occurred, the one or more events being from a group of events that includes a miscommunication between members of a software development team, a software transcription error, and inadequate training of the members of the software development team.

* * * * *